United States Patent
Nakamura

(10) Patent No.: US 8,218,181 B2
(45) Date of Patent: Jul. 10, 2012

(54) PRINTING SYSTEM

(75) Inventor: Tomoki Nakamura, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 755 days.

(21) Appl. No.: 12/344,726

(22) Filed: Dec. 29, 2008

(65) Prior Publication Data

US 2009/0174896 A1 Jul. 9, 2009

(30) Foreign Application Priority Data

Dec. 27, 2007 (JP) ................. 2007-335846

(51) Int. Cl.
*G06F 15/00* (2006.01)
*H04M 5/00* (2006.01)
(52) U.S. Cl. ................. 358/1.15; 379/265.02
(58) Field of Classification Search ........... 358/1.15
See application file for complete search history.

(56) References Cited

U.S. PATENT DOCUMENTS

| 7,283,258 B1 | 10/2007 | Kuno et al. | |
| 2007/0253005 A1* | 11/2007 | Ola et al. ................ | 358/1.1 |

FOREIGN PATENT DOCUMENTS

| JP | H04-107080 A | 4/1992 |
| JP | 2000-071582 | 3/2000 |
| JP | 2000-099624 A | 4/2000 |
| JP | 2006-227846 | 8/2006 |

OTHER PUBLICATIONS

Decision to Grant mailed Oct. 4, 2011 in corresponding Japanese Patent Application No. 2007-335846.

* cited by examiner

*Primary Examiner* — Saeid Ebrahimi Dehkordy
(74) *Attorney, Agent, or Firm* — Scully, Scott, Murphy & Presser, PC

(57) ABSTRACT

A printing system includes a printing device, and a printing data processing device. A status data generating unit generates status data indicating a status of the printing device. A storing unit stores status image data that graphically indicates a content of the status data. A text data generating unit generates status text data that explanatorily indicates a content of the status image data with words. A data editing unit edits the window data to include the status text data and the status image data. A display unit displays the window by using window data such that the window displays an image corresponding to the status image data and a text corresponding to the status text data. A specifying unit specifies the text on the window. A voicing unit voices the specified text based on the corresponding status text data.

12 Claims, 13 Drawing Sheets

PRINTING SYSTEM

CROSS REFERENCE TO RELATED APPLICATION

This application claims priority from Japanese Patent Application No. 2007-335846 filed Dec. 27, 2007. The entire content of the priority application is incorporated herein by reference.

TECHNICAL FIELD

The invention relates to a printing system comprising a printer capable of executing desired printing operations with consumables, and a print data processor and a control program for a printing system capable of acquiring data indicating the status of the printer. The invention particularly relates to a printing system and to a control program for the printing system capable of reporting the status of the printer based on the acquired status through a screen display and voiced output.

BACKGROUND

A printing system well known in the art acquires status data from a printer indicating the status of the printer, and displays this status based on the acquired data on a display unit. By viewing this display, the user can determine the status of the printer, i.e., whether the printer is in a condition capable of printing the job, and can take appropriate measures when the printer is unable to execute the printing operation.

One such printing system is disclosed in Japanese unexamined patent application publication No. 2000-071582. This printing system reports the quantity of residual ink in the printer. Specifically, prior to printing print data, the printing system acquires a quantity of residual ink in the printer as status data. The printing system also estimates the quantity of ink necessary for executing a printing operation based on the print data and displays the estimated quantity of ink together with the quantity of residual ink in a graph on the display unit. Accordingly, if there is insufficient ink for executing the printing operation based on the print data, for example, the printing system described in Japanese unexamined patent application publication No. 2000-071582 can notify the user prior to printing the print data that the operation cannot be executed until ink is replenished.

SUMMARY

The conventional printing system described above always reports the quantity of residual ink and other data related to the printer status to the user on the display unit. Therefore, the user cannot take appropriate measures on the printer if the user cannot view information on printer conditions displayed on the display unit.

However, this type of printing system is used not only by people who are physically unimpaired, but in some cases by visually impaired users, such as users with weak eyesight. Since the conventional printing system described above reports conditions of the printer only through the display unit, the conventional system cannot reliably report the conditions of the printer to visually impaired users and the like.

Today, voicing software capable of recognizing text data and outputting the text as voice is well known in the art. This voicing software, referred to as a "screen reader," is used by physically impaired users who are physically unable to read displayed text and children, foreign citizens, and the like who have difficulty reading the displayed language.

In view of the foregoing, it is an object of the invention to provide a printing system capable of accurately reporting the state of a printer to every user.

In order to attain the above and other objects, the invention provides a printing system. The printing system comprises a printing device, a storing unit, a text data generating unit, and a printing data processing device. The printing device is configured to perform printing based on print data by using consumables. The printing device comprises a status data generating unit that generates status data indicating a status of the printing device. The storing unit stores status image data that graphically indicates a content of the status data. The text data generating unit generates status text data that explanatorily indicates a content of the status image data with words. The printing data processing device comprises a display unit and a window data storing unit, a data editing unit, a specifying unit, and a voicing unit. The display unit displays a window. The window data storing unit stores window data having information about the window. The window data is used to display the window. The data editing unit edits the window data to include the status text data and the status image data. The display unit displays the window by using the window data such that the window displays an image corresponding to the status image data and a text corresponding to the status text data. The specifying unit specifies the text on the window. The voicing unit voices the specified text based on the corresponding status text data.

According to another aspects, the invention provides a computer-readable storage medium storing a set of program instructions executed by a computer for controlling a printing system that comprises a printing device, a storing unit, and a printing data processing device. The printing device is configured to perform printing based on print data by using consumables. The printing device comprises a status data generating unit that generates status data indicating a status of the printing device. The storing unit stores status image data that graphically indicates a content of the status data. The printing data processing device comprises a display unit and a window data storing unit. The display unit displays a window. The window data storing unit stores window data having information about the window. The window data is used to display the window. The program instructions comprises (a) generating status text data that explanatorily indicates a content of the status image data with words, (b) editing the window data to include the status text data and the status image data, (c) displaying the window by using the window data such that the window displays an image corresponding to the status image data and a text corresponding to the status text data, (d) specifying the text on the window, and (e) voicing the specified text based on the corresponding status text data.

BRIEF DESCRIPTION OF THE DRAWINGS

Embodiments in accordance with the invention will be described in detail with reference to the following figures wherein.

DETAILED DESCRIPTION

Next, an embodiment of a printing system and a control program for a printing system according to the invention will be described while referring to the accompanying drawings.

Figure 1:
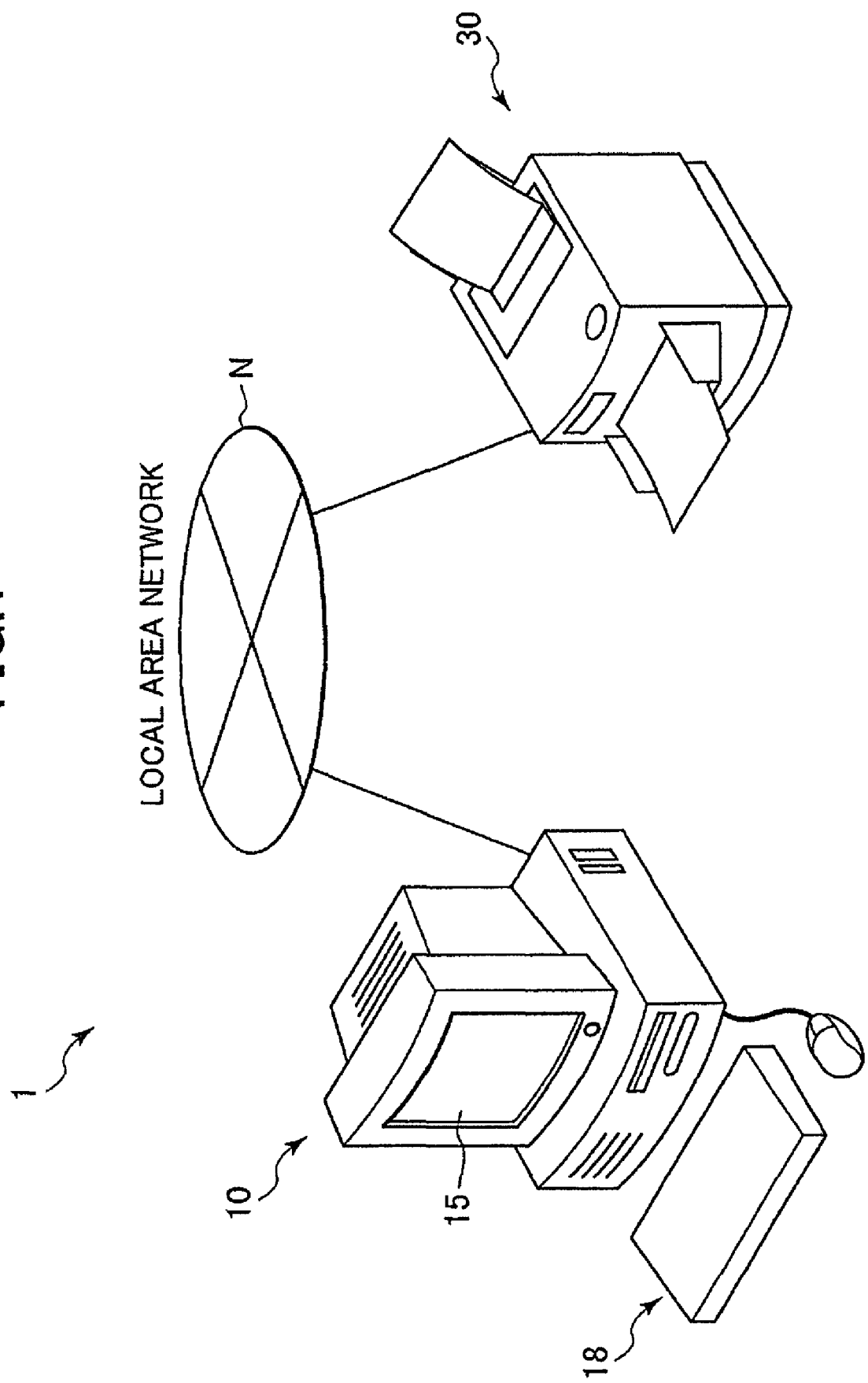
FIG. 1 is an explanatory diagram showing the configuration of a printing system according to an embodiment.

As shown in FIG. 1, the printing system 1 according to the embodiment includes a personal computer 10 and a printer 30. The personal computer 10 and printer 30 are connected to each other via a local area network (LAN) N. Hence, the personal computer 10 and printer 30 can transmit data to and receive data from each other in this printing system 1.

The printing system 1 according to the invention is not limited to the configuration shown in FIG. 1, in which a single personal computer 10 is connected to a single printer 30 via the LAN N. For example, the printing system 1 may be configured of a plurality of personal computers 10 connected to a plurality of printers 30, or may be configured of the personal computer 10 and the printer 30 connected to each other via a USB cable.

Next, the structure of the personal computer 10 in the printing system 1 will be described in detail.

As shown in FIG. 1, the personal computer 10 includes a display unit 15, and an operating unit 18. The display unit 15 is configured of a CRT monitor, liquid crystal display, or the like and functions to display images based on various data. The operating unit 18 is configured of a keyboard or mouse, for example, and enables the user to input various operations.

Figure 2:
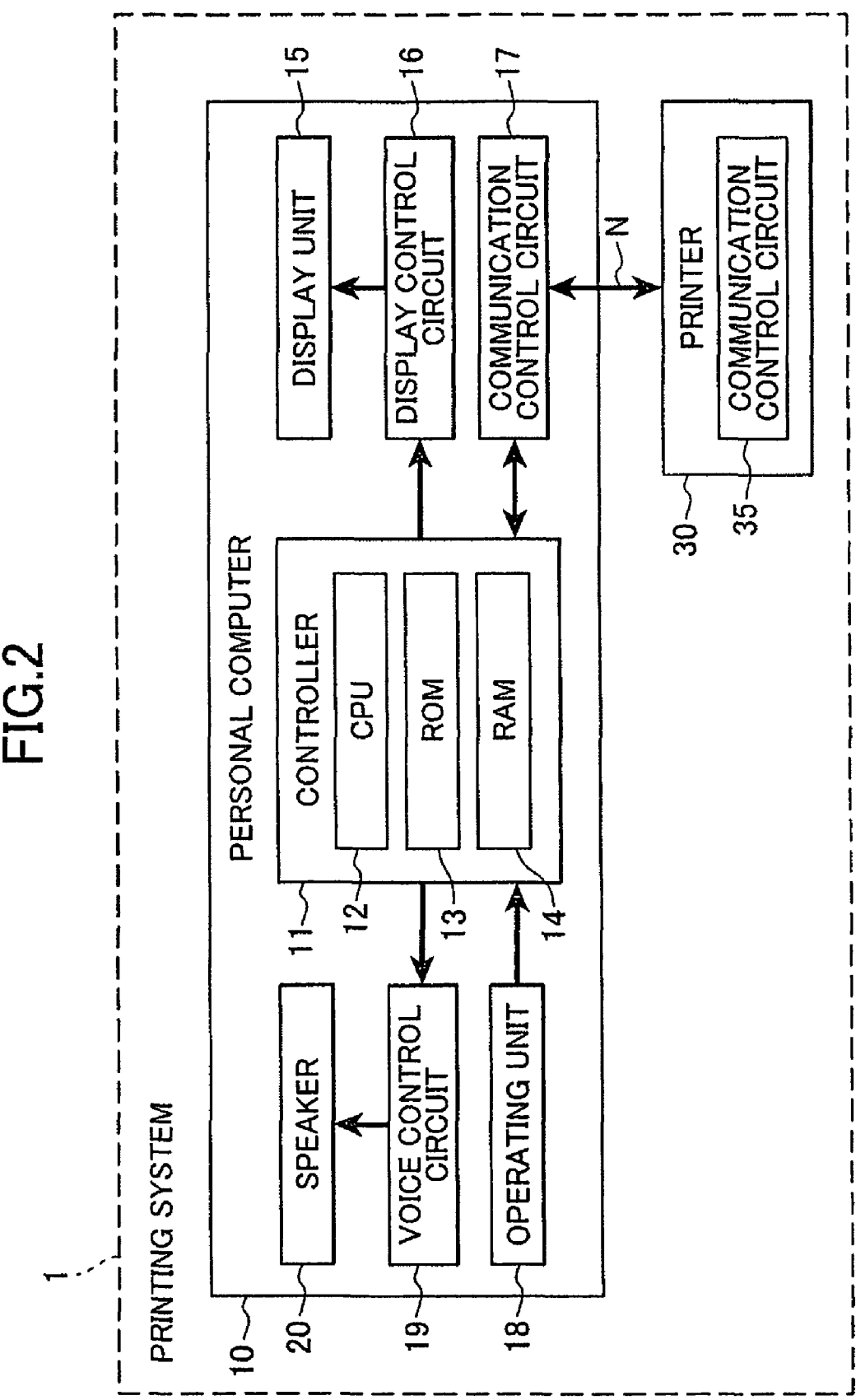
FIG. 2 is a block diagram showing primary features of a control system in a personal computer.

As shown in FIG. 2, the personal computer 10 includes a controller 11. The controller 11 performs central control for the personal computer 10 and includes a CPU 12, a ROM 13, and a RAM 14. The CPU 12 is a central processing unit that serves to control various peripheral devices according to data tables and control programs stored in the ROM 13 and RAM 14.

The ROM 13 is a non-rewritable memory that stores various control programs, and data tables. The ROM 13 also stores programs for a voicing process (see FIG. 6) and a status reporting process (see FIG. 9) described later. The ROM 13 also stores a database of lexical data, including "black," "magenta," and the like to indicate ink colors, and "A4" to indicate sizes of recording paper. The CPU 12 references this lexical data in a process for generating residual quantity reporting text (S43) and a process for generating residual quantity warning text (S48) described later.

The RAM 14 is a rewritable memory for storing various data. The RAM 14 temporarily stores results of computations and the like performed when the CPU 12 executes control programs.

The controller 11 is also connected to a display control circuit 16, a communication control circuit 17, the operating unit 18, and a voice control circuit 19. The display control circuit 16 is used to control images displayed on the display unit 15 based on signals received from the controller 11. Therefore, the personal computer 10 can use the display control circuit 16 to display a window on the display unit 15 based on window data described later according to a control program, such as the operating system.

The communication control circuit 17 is used in control operations related to data communications with the printer 30 via the LAN N. Hence, the personal computer 10 can transmit print data, print execution signals, and other data and signals to the printer 30 via the communication control circuit 17. The personal computer 10 can also receive status data from the printer 30 via the communication control circuit 17. The status data will be described later in greater detail.

As described above, the operating unit 18 enables the user to input various operations. Since the operating unit 18 is connected to the controller 11, the controller 11 can receive operation signals from the operating unit 18. Hence, the personal computer 10 can implement control based on operation signals received in response to user operations. For example, if the user specifies an advanced settings operation on the operating unit 18, the personal computer 10 can execute an advanced settings process for the status window (S22) described later.

The voice control circuit 19 is connected to a speaker 20. Therefore, the personal computer 10 can control the form of voice outputted from the speaker 20 via the voice control circuit 19 based on a control program stored in the ROM 13. Specifically, the personal computer 10 can output text displayed in a window on the display unit 15 as voice based on a program for implementing a voicing process described later.

Next, the basic structure of the printer 30 in the printing system 1 according to the embodiment will be described.

Figure 3:
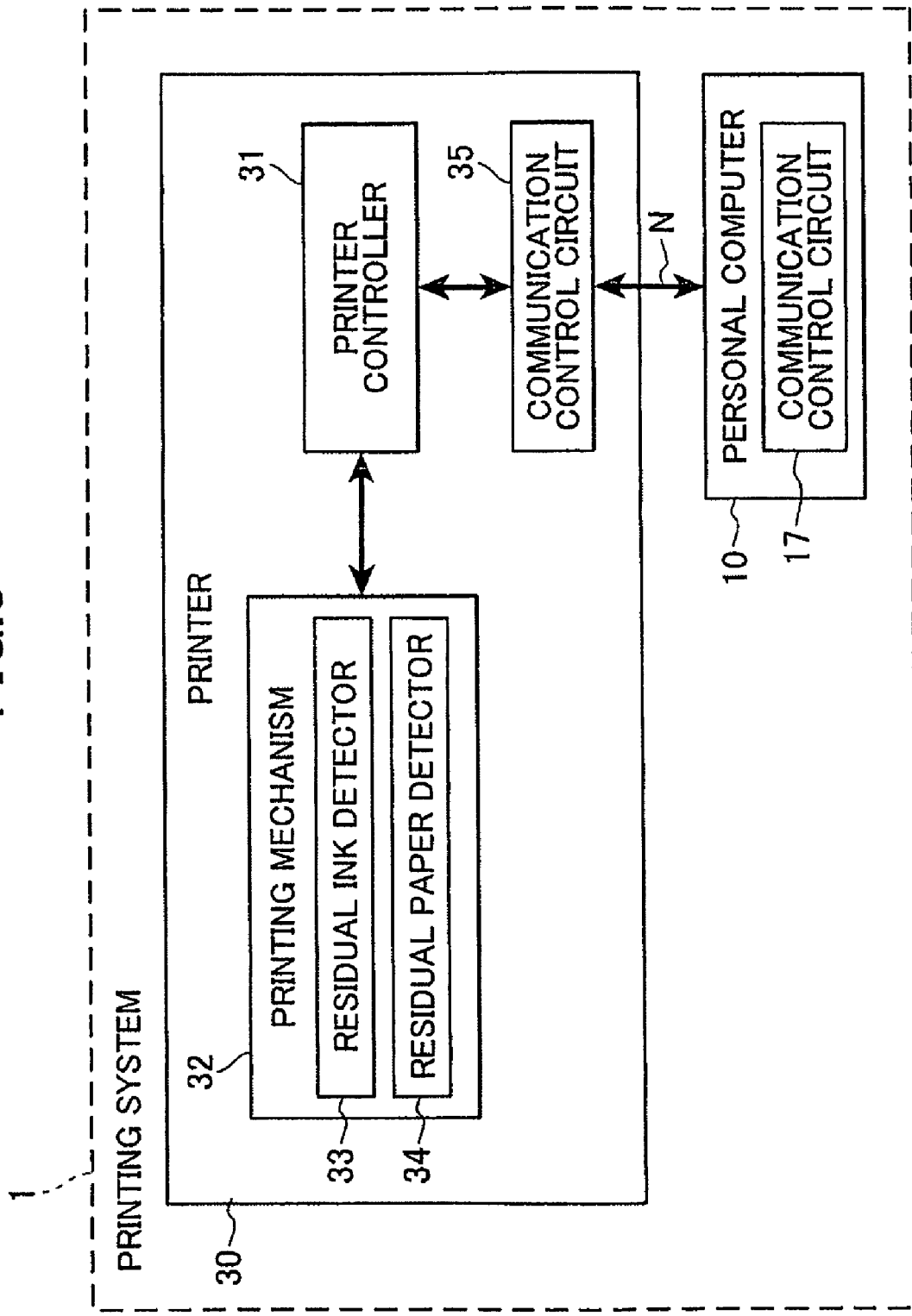
FIG. 3 is a block diagram showing a primary configuration of a control system for a printer.

As shown in FIG. 3, the printer 30 has a printer controller 31 that performs the core of control operations for the entire printer 30. While not shown in the drawings, the printer controller 31 is configured of a CPU, ROM, RAM, and the like. The CPU of the printer controller 31 performs various control processes, such as a process to record print data by executing a program for implementing a printer control process described later with reference to FIG. 4. The program for the printer control process is stored in the ROM of the printer controller 31. As will be described later, by executing the program for the printer control process, the printer controller 31 can transmit, to the personal computer 10, status data (see FIG. 5) indicating the status of the printer 30 ("Ready," "Paper jam," for example). Here, "Ready" indicates that the printer 30 can print image, and "Paper jam" indicates that a paper jam is occurred in the printer 30.

The printer 30 also includes a printing mechanism 32 configured of a conveying mechanism and a print head. The conveying mechanism functions to convey recording paper along a prescribed conveying path. The print head is an inkjet head and performs printing on recording paper based on print data by selectively ejecting ink supplied from ink cartridges. The basic structure of the print head and conveying mechanism are well known in the art and will not be described here.

The printer 30 according to the embodiment prints on a recording paper in four colors of ink: black, magenta, cyan, and yellow. Each of the four colors of ink is provided in a separate ink cartridge. Hence, the printing mechanism 32 has four ink cartridges for the four colors of ink. Each of the ink cartridges can be replaced.

The printing mechanism 32 also includes a residual ink detector 33. The residual ink detector 33 detects the quantity of residual ink in each ink cartridge. The residual ink detector 33 is connected to the printer controller 31. Hence, the printer controller 31 can acquire the quantity of residual ink for each color based on detection results in the residual ink detector 33. Since the method of detecting residual ink with the residual ink detector 33 is well known in the art, a detailed description of this method will not be given.

A paper cassette (not shown) is arranged in the printing mechanism 32. The paper cassette accommodates stacked sheets of recording paper of prescribed sizes (A3, A4, B4, and B5, for example). In a printing operation on the printer 30, the conveying mechanism conveys recording paper from the paper cassette.

The printing mechanism 32 also includes a residual paper detector 34. The residual paper detector 34 detects the quantity of residual recording paper in the paper cassette. The residual paper detector 34 is also connected to the printer controller 31. Hence, the printer controller 31 can acquire the quantity of residual recording paper in the paper cassette based on detection results in the residual paper detector 34. Since the method of detecting residual paper with the residual paper detector 34 is well known in the art, a detailed description of this method will not be provided.

The printer 30 also has a communication control circuit 35. The communication control circuit 35 is connected to the personal computer 10 and is used to control data transmission and reception between the printer 30 and the personal computer 10 via the LAN N. Specifically, the communication control circuit 35 is used to receive print data and various signals from the personal computer 10 and to transmit status data (see FIG. 5) and the like to the personal computer 10.

Figure 4:
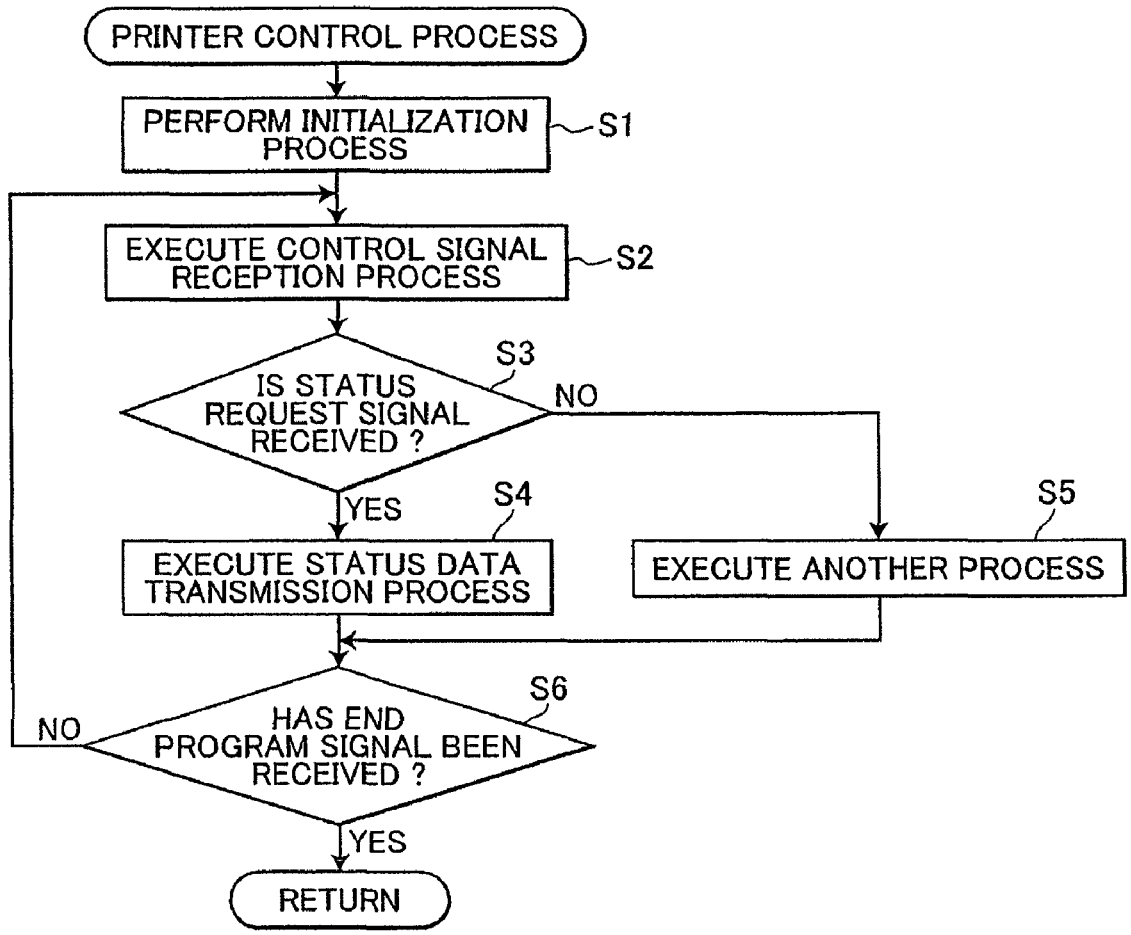
FIG. 4 is a flowchart illustrating steps in a printer control process.

Next, the program for the printer control process executed by the printer 30 of the embodiment will be described. FIG. 4 is a flowchart illustrating steps in the printer control process. The program for the printer control process is a control program used to control the entire printer 30 of the printing system 1 and is executed by the printer controller 31.

The printer control process begins when power to the printer 30 is turned on. In S1, the printer controller 31 performs an initialization process. In the initialization process, the printer controller 31 initializes various storage areas (a print buffer), for example. After completion of the initialization process, the printer controller 31 proceeds to S2.

In S2 the printer controller 31 executes a control signal reception process. In this process, the printer controller 31 receives control signals, such as a print execution signal or a status request signal, from the personal computer 10. The print execution signal is a command to record print data transmitted from the personal computer 10 together with print data. The status request signal is a request for the printer 30 to transmit data indicating the status of the printer 30. The control signal reception process in S2 is executed until one of the control signals is received. Signals received in the control signal reception process also include control signals for the printer 30.

In S3 the printer controller 31 determines whether a status request signal is received in S2. Specifically, the printer controller 31 determines whether a status request signal transmitted from the personal computer 10 has been received via the communication control circuit 35. When a status request signal has been received (S3: YES), in S4 the printer controller 31 executes a status data transmission process. When a status request signal has not been received (S3: NO), in S5 the printer controller 31 executes another process.

In the status data transmission process of S4, the printer controller 31 generates status data indicating conditions of the printer 30 and transmits this status data to the personal computer 10 that issued the request. After transmitting the status data, the printer controller 31 advances to S6.

Here, the status data generated in S4 will be described.

Figure 5:
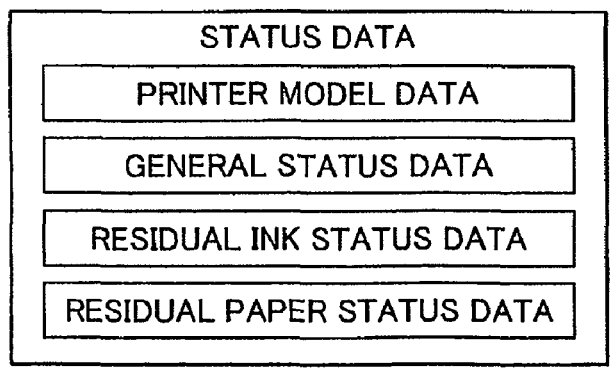
FIG. 5 is an explanatory diagram showing a content of status data.

As shown in FIG. 5, the status data according to the embodiment includes printer model data, general status data, residual ink status data, and residual paper status data.

Figure 11:
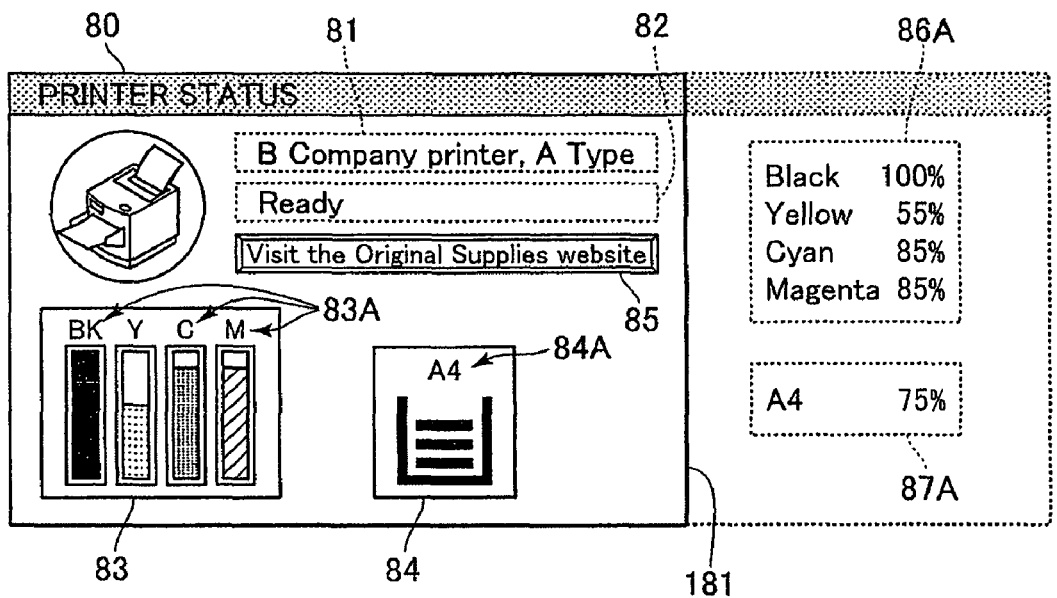
FIG. 11 is an example of the status window displayed at the first display size.

The printer model data indicates the manufacturer, and the model of the printer 30. An example of printer model data shown in FIG. 11 is "B Company printer, A Type." The printer model data is data unique to the printer 30 and stored in the ROM of the printer controller 31.

The general status data indicates the condition of the printer 30, and more specifically whether the printer 30 is in a state capable of printing. When the printer 30 is in a state incapable of printing, the general status data indicates the reason of this incapacity with data such as a "Paper jam." When the printer 30 is in a standby state, the general status data indicates "Ready." When the printer 30 is incapable of printing due to mechanical failure of the printing mechanism 32, the general status data indicates "Cannot print." If paper is jammed in the printing mechanism 32, the general status data indicates a "Paper jam." The printer controller 31 generates this general status data in S4 by confirming the condition of the printer controller 31 and the printing mechanism 32 (conveying mechanism and the like). Since the general status data is well known in the art, a more detailed description of this data will not be given.

The residual ink status data indicates the quantity of ink remaining in each of the four ink cartridges in the printer 30. Hence, the residual ink status data indicates the amount of remaining ink in each of the four colors black, magenta, cyan, and yellow. The printer controller 31 generates this residual ink status data based on detection results from the residual ink detector 33.

The residual paper status data indicates the size and quantity of recording paper remaining in the paper cassette of the printer 30. The printer controller 31 generates this residual paper status data based on detection results from the residual paper detector 34 and the like. The printer controller 31 determines the recording paper size based on a setting for paper size in the paper cassette.

In S5 the printer controller 31 executes a different process corresponding to the control signal received in S2. For example, if the printer controller 31 has received a print execution signal in the control signal reception process of S2, in S5 the printer controller 31 performs a printing operation on recording paper based on print data. After completing the process in S5, the printer controller 31 advances to S6.

In S6 the printer controller 31 determines whether an end program signal has been received. If an end program signal has been received (S6: YES) the printer controller 31 executes a prescribed ending process to end the program for the printer control process. However, if an end program signal has not been received (S6: NO), the printer controller 31 returns to S2. In this case, the printer controller 31 waits for a new control signal to be received and executes the process in S3-S6 based on the newly received control signal.

Figure 6:
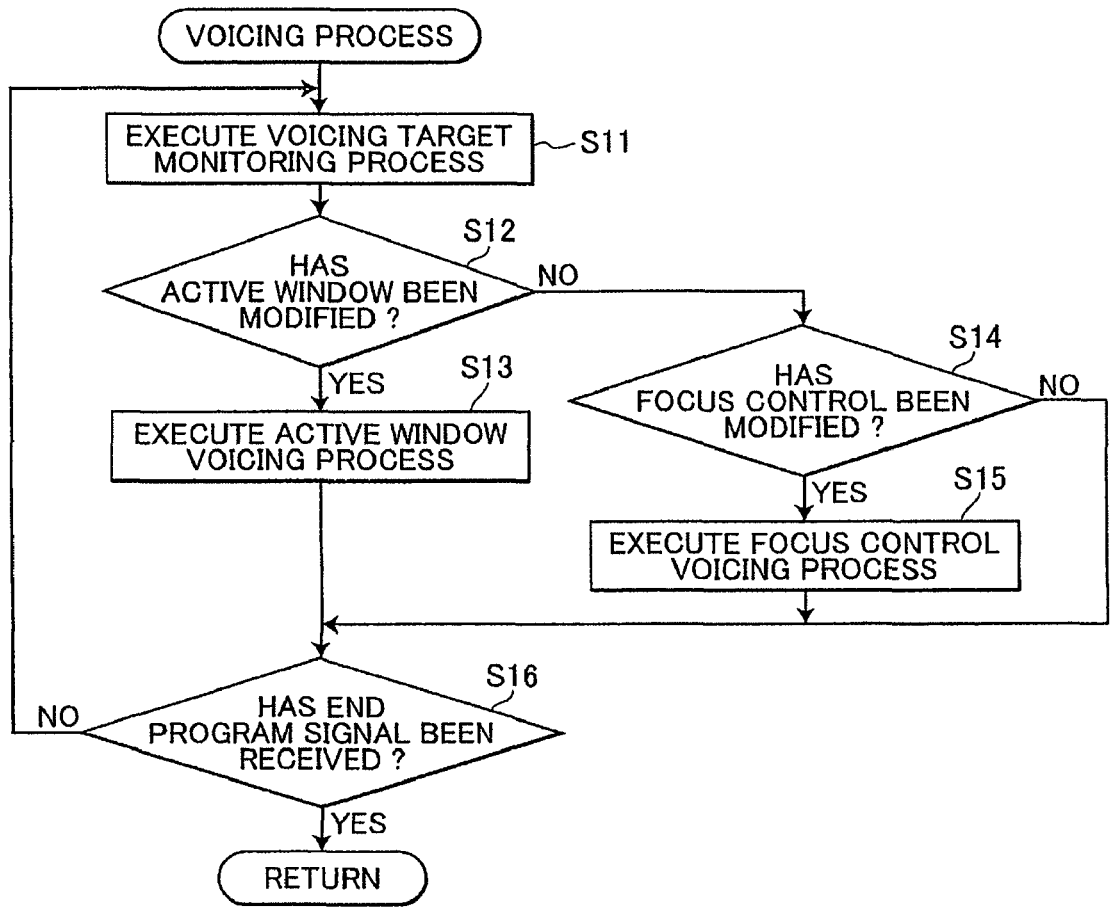
FIG. 6 is a flowchart illustrating steps in a voicing process of the embodiment.

Next, the program for the voicing process executed by the personal computer 10 will be described. FIG. 6 is a flowchart illustrating steps in the voicing process of the embodiment. The following description assumes that the power to the personal computer 10 is turned on and the personal computer 10 is under control of an operating system.

The program for the voicing process is executed in response to an operation that the user performs on the operating unit 18. At the beginning of the voicing process, in S11, the CPU 12 executes a voicing target monitoring process to monitor changes in windows and controls targeted for voicing.

Figure 7:
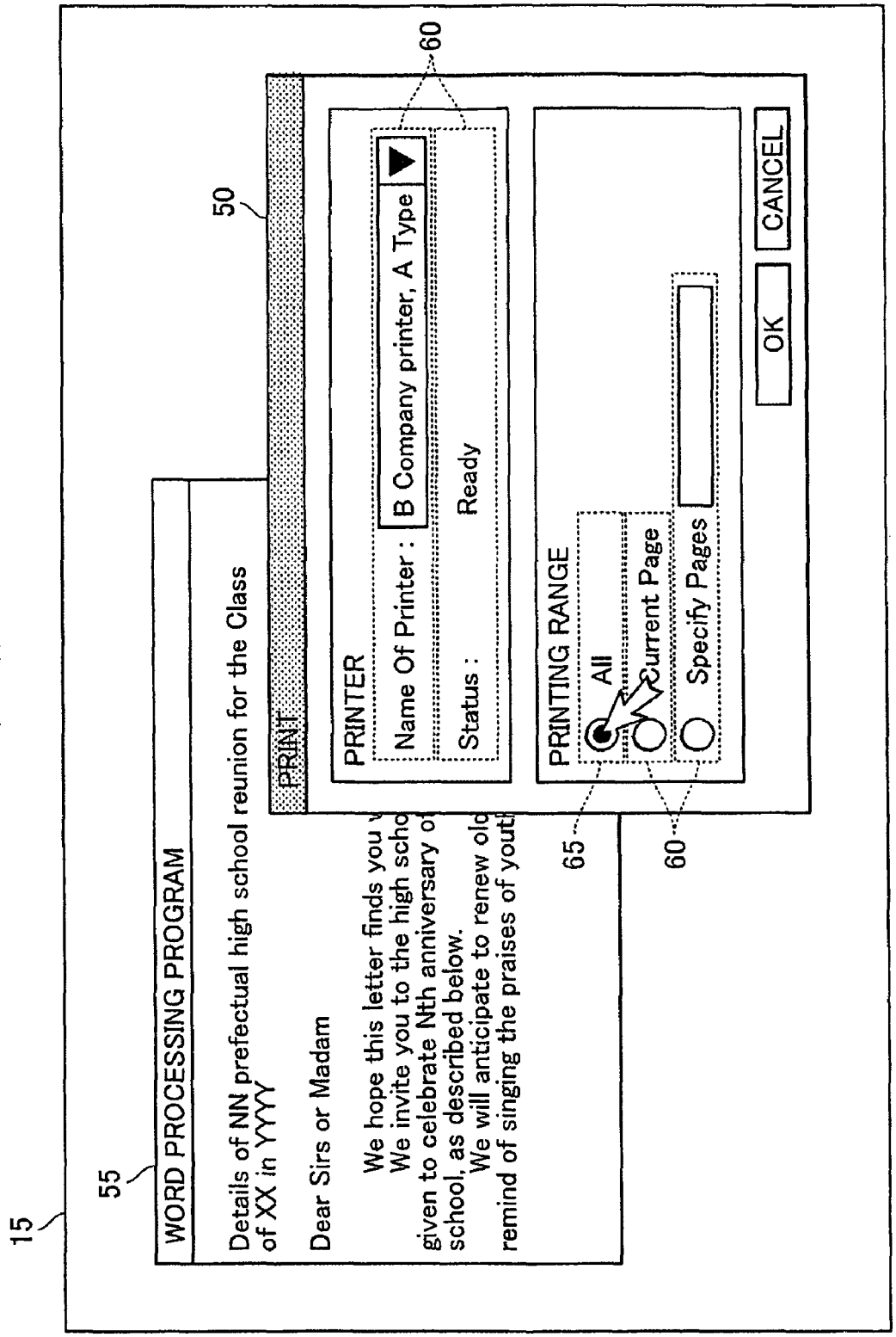
FIG. 7 is an explanatory diagram showing a sample screen display on a display unit of the personal computer.

Windows and controls targeted for voicing will be described next in greater detail. FIG. 7 is an explanatory diagram showing a sample screen display on the display unit 15 of the personal computer 10.

In the embodiment, an operating system employing a window system is employed on the personal computer 10. The operating system includes a window manager, which is a program for managing the window system. Specifically, by executing the window manager, the personal computer 10 can modify the behavior, the size, and the design of windows displayed on the display unit 15, for example. A window is a rectangular display region on the display unit 15 assigned to an application program and the like. The RAM 12 stores window data corresponding to the window. The window data includes data concerning the corresponding window. Content is displayed in each window based on corresponding window data. For example, the content in a window shown in FIG. 7 for a word processing program is configured of test data ("Details of NN prefectural high school reunion for the Class of XX in YYYY," in this example) included in the window data. In this way, the personal computer 10 can display a plurality of windows on the display unit 15 based on user operations, as shown in FIG. 7.

In the example of FIG. 7, the display unit 15 displays an active window 50 and an inactive window 55. The active window 50 is the window currently in use when a plurality of windows is open. In the example of FIG. 7, the Print window corresponds to the active window 50. A mouse pointer or a cursor are ordinarily displayed in the active window 50, enabling the user to input instructions. The inactive window 55 is a window not currently operating in the window system. In the example of FIG. 7, a window for a word processing program corresponds to the inactive window 55. The window manager modifies the active window 50 and inactive window 55 based on user operations on the operating unit 18.

Each window is configured of including controls 60. The control 60 is a graphical user interface (GUI) element often called a widget, such as a button (e.g., a radio button), a text box, and a drop-down list. The Print window shown in FIG. 7 has a plurality of controls 60, including radio buttons for selecting a printing range.

In the embodiment, the currently selected control 60 is referred to as a focus control 65. The focus control 65 is acceptable the user's input operation. The operating system changes which control 60 is the focus control 65 based on user operations on the operating unit 18.

Hence, in the voicing target monitoring process of S11, the CPU 12 monitors changes in the active window 50 and changes in the focus control 65 based on operation signals inputted via the operating unit 18. The CPU 12 ends the voicing target monitoring process and advances to S12 upon detecting a user operation for the window or the control 60 based on operation signals inputted via the operating unit 18.

In S12 the CPU 12 determines whether the active window 50 has been modified by a user operation. Specifically, the CPU 12 determines whether the user performed an operation to start an application program or to select a different window based on the operation signal from the operating unit 18. The CPU 12 advances to S13 if the active window 50 has been changed (S12: YES) and advances to S14 if the active window 50 has not been changed (S12: NO).

In S13 the CPU 12 executes an active window voicing process. In the active window voicing process, the CPU 12 acquires all text data included in the window data for the active window 50. The CPU 12 then outputs a symbolic linguistic representation including phonetics symbols and prosodic data based on the acquired text data. Subsequently, the CPU 12 outputs voice data for the text data based on the symbolic linguistic representation. The voices that read the text data are outputted from the speaker 20. After reading all text data in the window data for the active window 50, the CPU 12 ends the active window voicing process and advances to S16.

When advancing to S14 based on the determination results in S12, the CPU 12 determines whether the focus control 65 has been modified. Specifically, the CPU 12 determines whether a different control 60 has been selected as the focus control 65 based on the operation signal inputted via the operating unit 18. The CPU 12 advances to S15 if the focus control 65 has been modified (S12: YES) and advances to S16 if the focus control 65 has not been modified (S12: NO).

In S15 the CPU 12 executes a focus control voicing process. In the focus control voicing process, the CPU 12 identifies the window data in which the focus control 65 belongs. The window data includes text data corresponding each control. The CPU 12 acquires text data corresponding to the focus control 65 included in the window data and subsequently converts the acquired text data for the focus control 65 to a symbolic linguistic representation and outputs the text data as voice data. In the example of FIG. 7, since the user selects "All", the CPU 12 outputs the word "All" for the printing range as voice data. After reading text data for the focus control 65, the CPU 12 ends the focus control voicing process and advances to S16.

In S16 the CPU 12 determines whether an end program signal has been received. If an end program signal has been received (S16: YES), the CPU 12 executes a prescribed ending process to end the voicing process of FIG. 6. However, if an end program signal has not been received (S16: NO), the CPU 12 returns to S11 and repeats the voicing target monitoring process described above.

Accordingly, the CPU 12 of the personal computer 10 voices content in the active window 50 and the focus control 65 according to user operations and the like until the voicing process ends.

Next, a status window 80 displayed on the display unit 15 of the personal computer 10 will be described in detail.

In the present embodiment, the window data corresponding to the status window 80 is referred as status window data. In other words, the status window data is one of examples of the window data corresponding to the status window 80. The status window data is configured of having general text data, original supplier data, residual ink status image data, residual paper status image data, residual ink status text data, and residual paper status text data (see FIGS. 14 and 15). The general text data is configured of having printer model data and general status data. The original supplier data is configured of having original supplier text data and original supplier image data. The residual ink status image data is configured of having residual ink identification display data. The residual paper status image data is configured of having residual paper identification display data.

Figure 8:
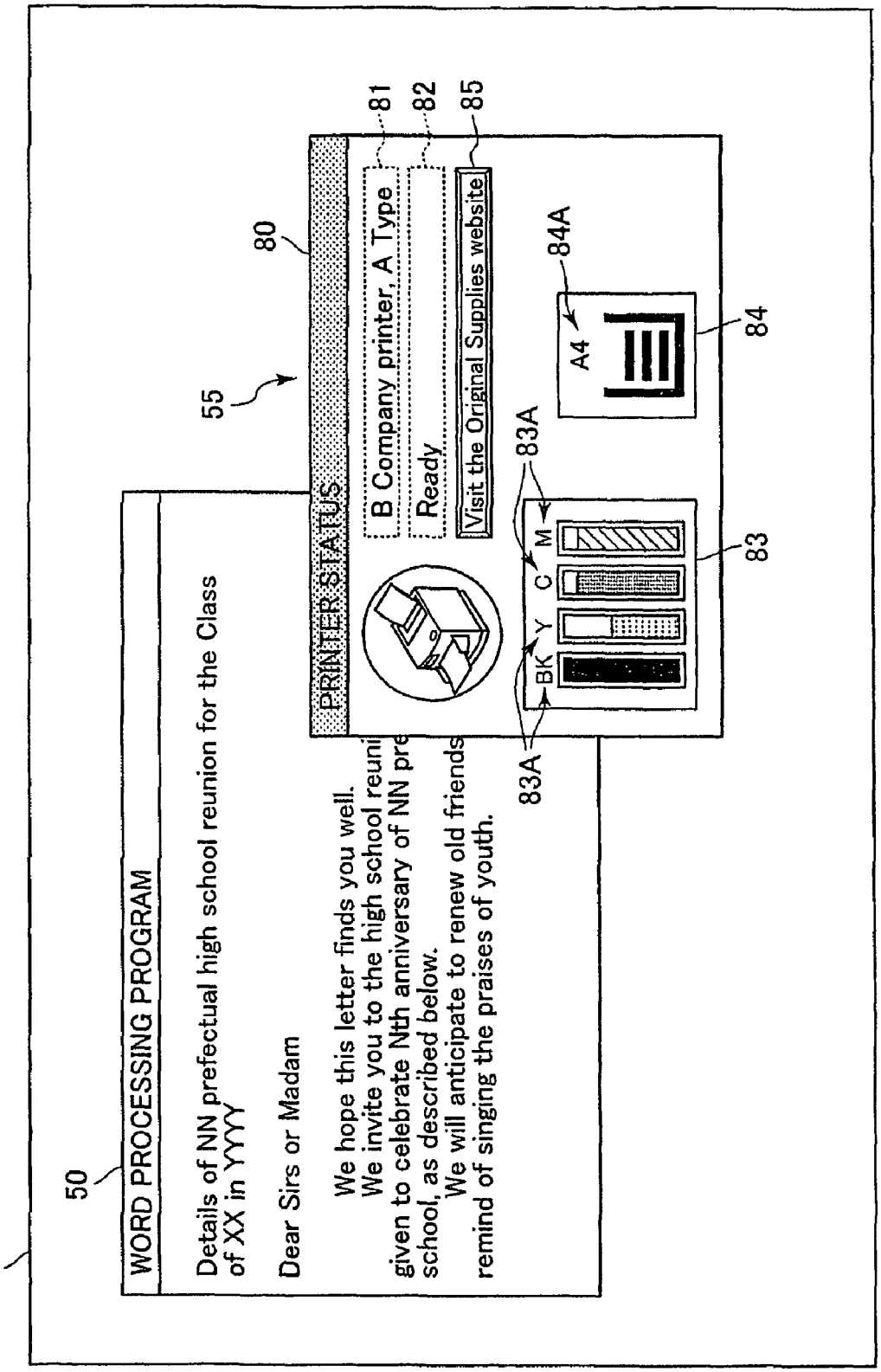
FIG. 8 is an explanatory diagram showing a sample screen including a status window displayed on the display unit.
Figure 14:
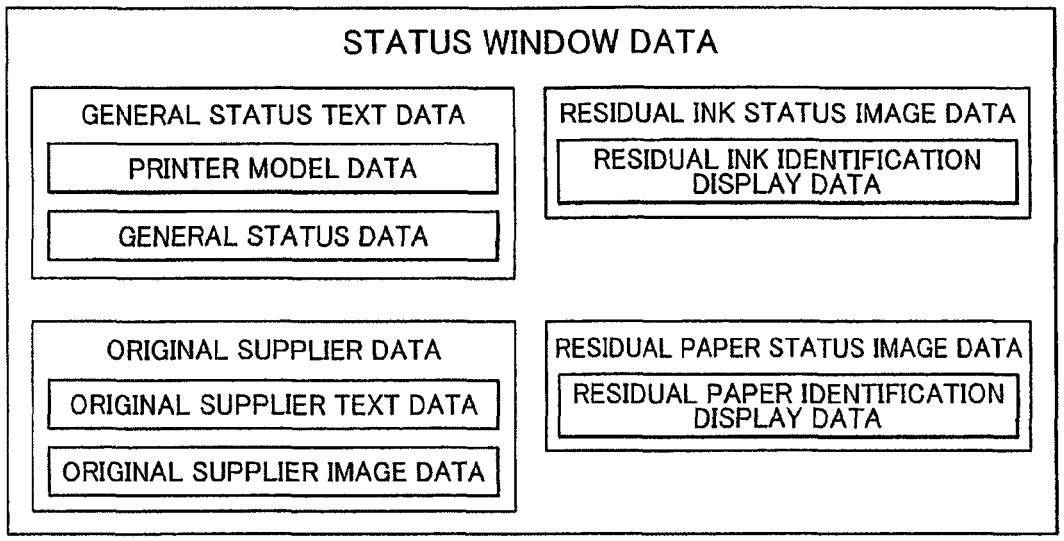
FIG. 14 is an explanatory diagram showing a content of status window data including residual ink status image data and residual paper status image data.
Figure 15:
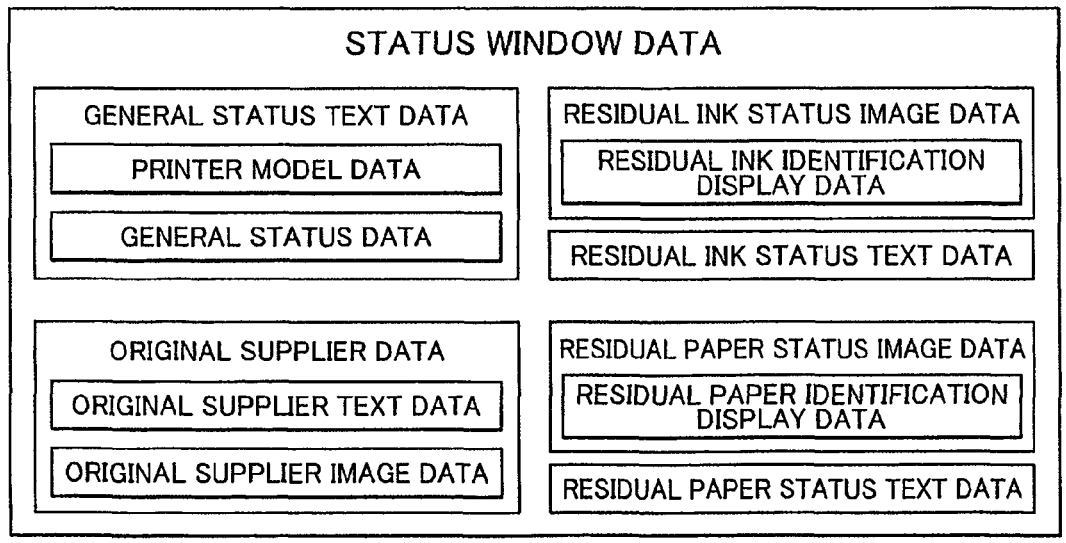
FIG. 15 is an explanatory diagram showing a content of status window data including residual ink status text data and residual paper status text data.

As shown in FIG. 8, the status window 80 is displayed as a single window on the display unit 15 based on the status window data (see FIGS. 14 and 15). The status window 80 displays the status of the printer 30 in the printing system 1 based on status data acquired from the printer 30. Specifically, the status window 80 displays printer model name text 81, general status text 82, a residual ink graph 83, a residual paper graph 84, and an original supplier link button 85.

The printer model name text 81 is text data for the model name of the printer 30 and the like (for example, the manufacturer and model name). The printer model name text 81 is displayed based on the printer model data in the status window data. The printer model data is included in the status window data under the general text data. That is, the CPU 12 stores the printer model data when the status data is received from the printer 30. As shown in FIG. 5, the printer model data is part of the status data transmitted from the printer 30 in S4 of the printer control process. For example, if the status data is transmitted from an A Type printer 30 manufactured by B Company, the status window 80 displays the text data "B Company printer, A Type" as the printer model name text 81.

The general status text 82 is text indicating the status of the printer 30 and is displayed based on the general status data included in the status window data under "general text data." As shown in FIG. 5, the general status data is included in the status data transmitted from the printer 30 in S4. For example, if the printer 30 transmits status data when in a state capable of printing, the text data "Ready" is displayed in the status window 80 as the general status text 82.

The residual ink graph 83 is image showing the quantity of remaining ink in each ink cartridge of the printer 30. Specifically, the displayed residual ink graph 83 is configured of bar graphs indicating the remaining quantities of ink in each of the four colors based on the residual ink status data. In other words, the contents of the graphic image constituting the residual ink graph 83 varies according to the quantities of residual ink specified in the residual ink status data. The residual ink status data is also included in the status data transmitted from the printer 30 (see FIG. 5).

The residual ink graph 83 also includes a color ID display 83A including the characters "BK," "Y," "C," and "M." The characters in the color ID display 83A denote the ink colors black, yellow, cyan, and magenta and are positioned near the bar for the corresponding color. In the initial setting, the color ID display 83A is displayed as text (test display) in the residual ink graph 83.

The residual paper graph 84 is image representing the quantity of recording paper remaining in the paper cassette of the printer 30. The quantity of residual recording paper in the paper cassette is expressed as lines in a graphical image indicating the level of residual paper based on the residual paper status data. Specifically, the details of the graph in the residual paper graph 84 vary according to the quantity of residual recording paper in the paper cassette indicated in the residual paper status data. The residual paper status data is also included in the status data transmitted from the printer 30 (see FIG. 5).

The residual paper graph 84 also includes a paper size ID display 84A indicating the size of the recording paper, such as A4. The paper size ID display 84A is displayed near the residual paper graph, as shown in FIG. 8. In the initial setting, the paper size ID display 84A is displayed as text (text display) in the residual paper graph 84.

The original supplier link button 85 is provided with an embedded hyperlink to the Internet Web site of the manufacturer providing original consumables for the printer 30, such as ink cartridges and recording paper. The original supplier link button 85 is displayed based on the original supplier data included in the status window data. As shown in FIG. 14, for example, the original supplier data includes original supplier text data and original supplier image data. In the initial setting, the character string on the original supplier link button 85 is displayed as text (text display) based on the original supplier text data. When the user performs an operation on the original supplier link button 85, the personal computer 10 launches an Internet browser to display the manufacturer's Web site.

Figure 9:
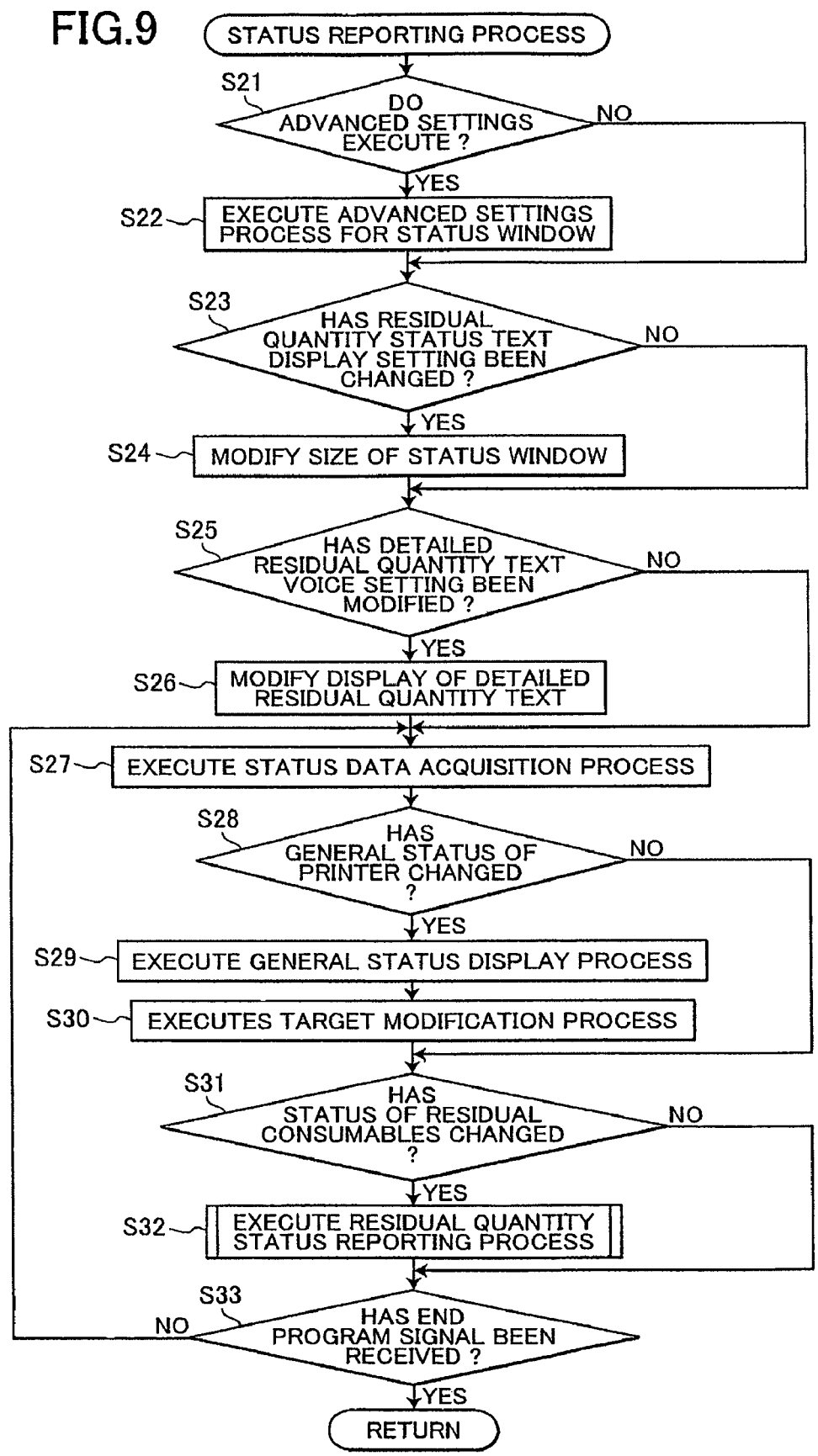
FIG. 9 is a flowchart illustrating steps in a status reporting process.

Next, a program executed by the personal computer 10 to implement a status reporting process will be described in detail. FIG. 9 is a flowchart illustrating steps in the status reporting process. In the following description, it will be assumed that the status window 80 described above has been displayed on the display unit 15. The status window 80 according to the embodiment is displayed in response to a user operation instructing that the window be displayed or when an error such as a paper jam occurs in the printer 30.

In S21 at the beginning of the status reporting process for the status window, the CPU 12 determines whether to execute advanced settings. Specifically, the CPU 12 determines based on an operation signal from the operating unit 18 whether the user has inputted an instruction to perform advanced settings. The CPU 12 advances to S22 if the user has inputted an instruction to perform advanced settings (S21: YES). The CPU 12 advances to S23 if the user has not inputted the instruction to perform advanced settings (S21: NO).

Figure 10:
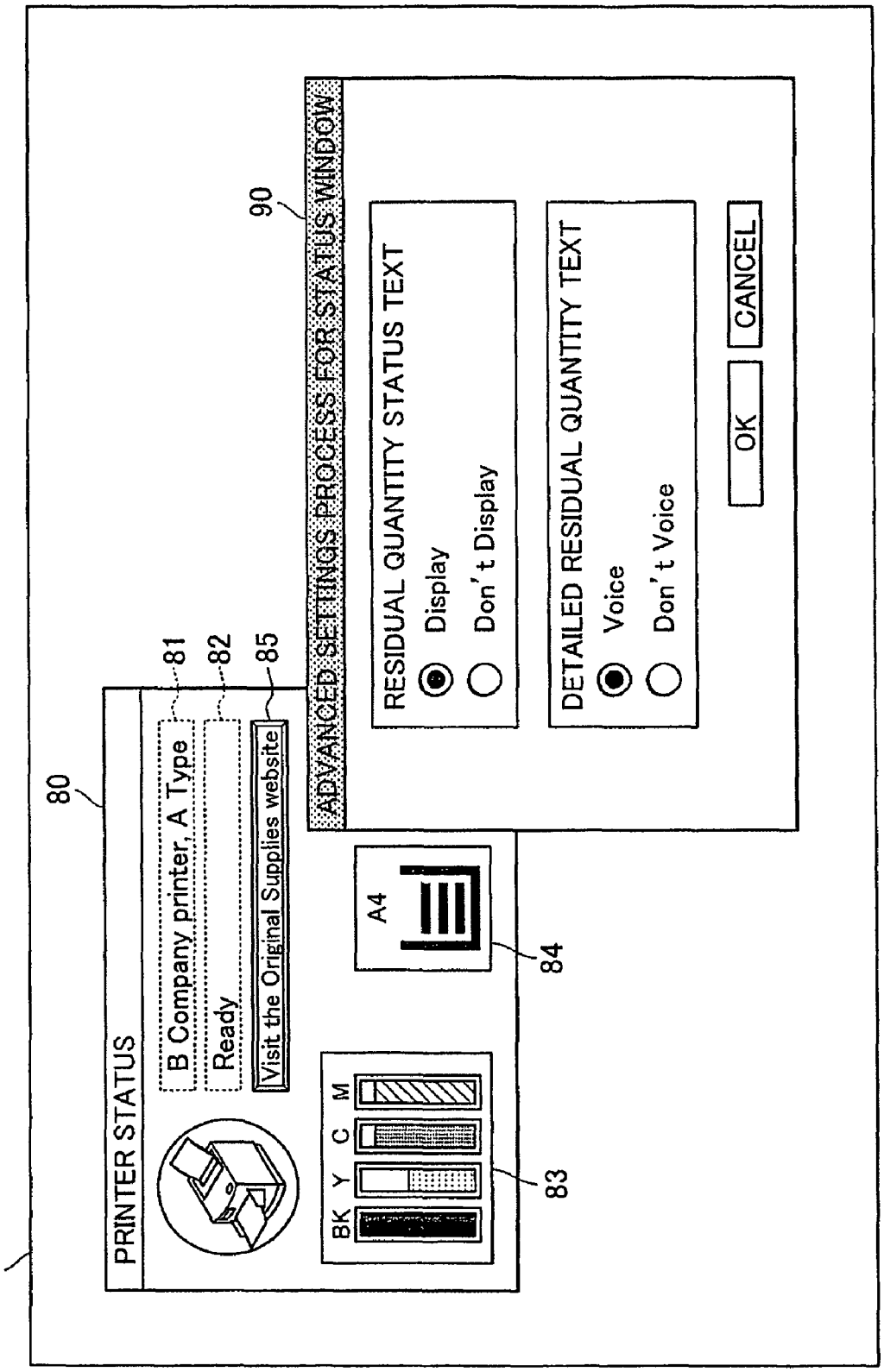
FIG. 10 is an explanatory diagram showing a sample screen including an advanced settings window displayed on the display unit.

In S22 the CPU 12 executes an advanced settings process for the status window. In the advanced settings process for the status window, the CPU 12 displays an advanced settings window 90 on the display unit 15 (see FIG. 10). As shown in FIG. 10, the advanced settings window 90 includes a plurality of advanced settings. Specifically, the CPU 12 displays in the advanced settings window 90 advanced setting items titled "Residual quantity status text" and "detailed residual quantity text", for example. The advanced setting item titled "Residual quantity status text" is for specifying whether to display or not display residual quantity status text described later (e.g., "Display" or "Don't display"). Hereinafter, this setting that determines whether to display or not display the residual quantity status text is referred as "residual quantity status text display setting". The advanced setting item titled "Detailed residual quantity text" is for specifying whether to voice detailed residual quantity text, such as the color ID display 83A and paper size ID display 84A (e.g., "Voice" or "Don't voice"). Hereinafter, the setting that determines whether to voice detailed residual quantity text is referred as "detailed residual quantity text voice setting". Hence, by operating the operating unit 18, the user can input desired advanced settings for the content displayed in the status window 80. After the content of the advanced settings is stored in the RAM 14 based on the user's operations, the CPU 12 ends the advanced settings process for the status window and advances to S23.

In S23 the CPU 12 determines whether advanced settings for displaying or not displaying residual quantity status text (residual quantity status text display setting) described later has been changed. Specifically, the CPU 12 references the RAM 14 to determine whether the residual quantity status text display setting has been modified. The CPU 12 advances to S24 if the residual quantity status text display setting has been modified (S23: YES). The CPU 12 advances to S25 if the display setting has not been modified (S23: NO).

In S24 the CPU 12 executes a process to modify the size of the status window. In this process, the CPU 12 changes the size of the status window 80 displayed on the display unit 15 to a first display size (see FIG. 11) or a second display size (see FIG. 12) based on the modified display setting. After modifying the display size of the status window 80, the CPU 12 ends the status window size modification process and advances to S25.

Here, the display size of the status window 80 modified in the status window size modification process of S24 will be described in detail with reference to the drawings.

Figure 16:
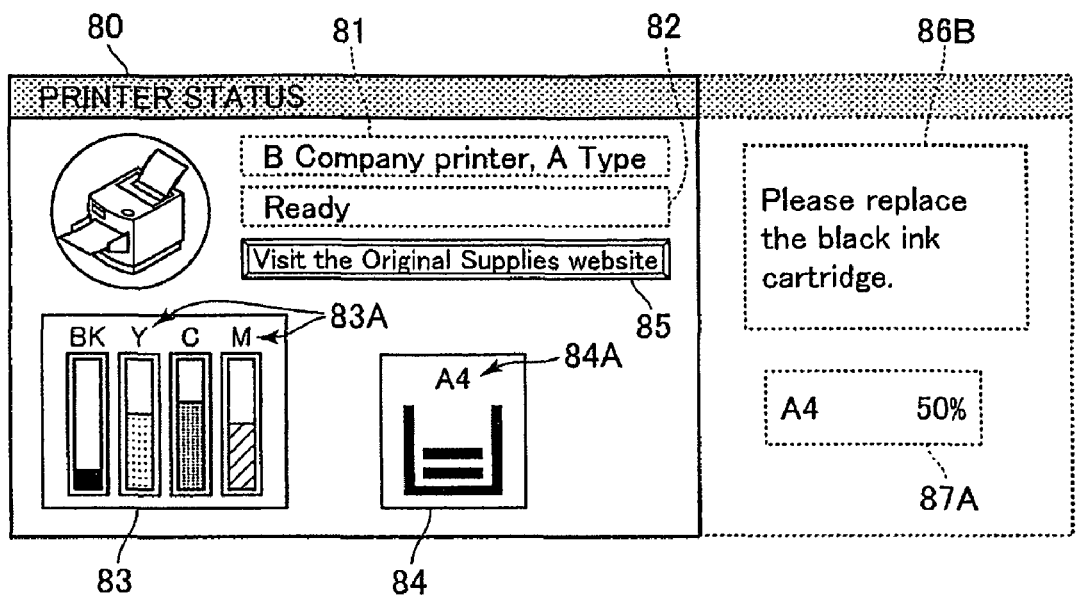
FIG. 16 is an explanatory diagram showing the status window when the residual ink warning text is voiced.

As described above, the status window 80 is displayed on the display unit 15 based on status window data (see FIGS. 14 and 15). In a process for reporting residual quantities (S32) described later, text data indicating the residual quantities of consumables is added to the status window data in the embodiment. This residual quantity status text data includes residual ink status text data and residual paper status text data (see FIG. 15). Hence, the CPU 12 can display residual quantity status text based on the text data for residual quantities of consumables in the status window 80 in addition to the display elements 81-85 described above (see FIG. 12). The residual quantity status text includes residual ink reporting text 86A (FIG. 11), residual ink warning text 86B (FIG. 16), residual paper reporting text 87A (FIG. 11), and residual paper warning text 87B (FIG. 16).

Here, a first display size of the status window 80 will be described. In the explanatory diagrams of FIGS. 11 and 16, the extended portion of the status window 80 and elements therein depicted with dotted lines are not displayed on the display unit 15, whether or not the residual ink status text data and the residual paper status text data exist in the status window data.

The first display size restricts the status window 80 so that the residual quantity status text is not displayed. Specifically, the first display size is set such that a right border 181 of the status window 80 is positioned to the left of the leftmost coordinates in the display position of the residual quantity status text. Consequently, the residual quantity status text is positioned outside the display region of the status window 80. By displaying the status window 80 at the first display size, the personal computer 10 can display only the display elements 81-85, as shown in FIG. 11. In this case, the personal computer 10 can set only the residual ink reporting text 86A and the residual paper reporting text 87A in a non-display state. When the display setting is modified to the non-display setting, in S24 the display size of the status window 80 is modified to the first display size.

Next, a second display size of the status window 80 will be described.

Figure 12:
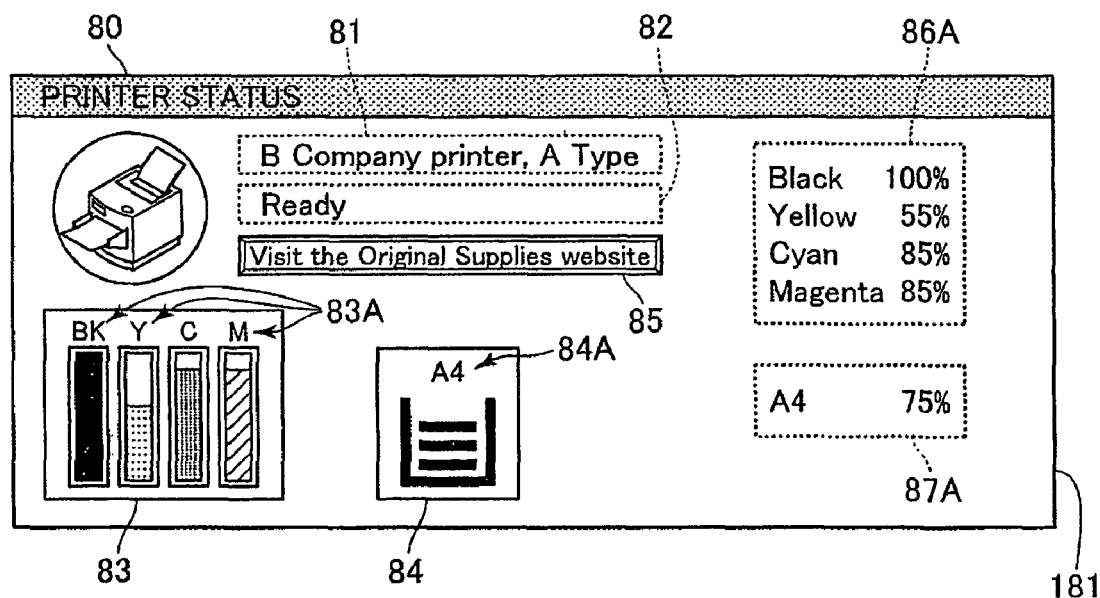
FIG. 12 is an explanatory diagram showing an example of the status window displayed at the second display size.

The second display size of the status window 80 is set to display all of the status window data, including the residual quantity status text. Specifically, the second display size is set such that the right border 181 of the status window 80 is positioned to the right of the rightmost coordinates in the display position of the residual quantity status text. Consequently, the residual quantity status text is positioned inside the display region of the status window 80. As shown in FIG. 12, by displaying the status window 80 at the second display size, the personal computer 10 can display the residual ink reporting text 86A and the residual paper reporting text 87A in addition to the display elements 81-85. Hence, when the display setting is modified, in S24 the display size of the status window 80 is modified to the second display size.

In S25 of the status reporting process, the CPU 12 determines whether the advanced settings "detailed residual quantity text voice setting" has been modified. The CPU 12 makes this determination by referencing the RAM 14. The CPU 12 advances to S26 if the detailed residual quantity text voice setting has been modified (S25: YES). The CPU 12 advances to S27 if the detailed residual quantity text voice setting has not been modified (S25: NO).

In S26 the CPU 12 executes a process to modify the display of detailed residual quantity text. Specifically, in this process the CPU 12 modifies the display form of the color ID display 83A in the residual ink graph 83 and the paper size ID display 84A in the residual paper graph 84 based on the content of the detailed residual quantity text voice setting. Here, the CPU 12 modifies the residual ink identification display data and residual paper identification display data in the status window data for the status window 80 based on the detailed residual quantity text voice setting.

Specifically, the CPU 12 displays the color ID display 83A and paper size ID display 84A as text when the voice setting is "Voice." In this process, the CPU 12 adds the residual ink identification display data as text data for BK, Y, C, and M and the residual paper identification display data in the status window data to the status window 80 as text data for A4. As described above, the CPU 12 outputs text data in the window data as voice when executing the program for the voicing process. Accordingly, by executing the program for the voicing process, the CPU 12 can display the color ID display 83A and the paper size ID display 84A and output the contents of these text displays as voice to notify the user.

On the other hand, if the voice setting is "Don't voice," the CPU 12 displays the color ID display 83A and paper size ID display 84A as images. In this case, the CPU 12 adds the residual ink identification display data and the residual paper identification display data in the status window data as image data for the characters BK, Y, C, M, and A4. As described above, the CPU 12 does not output image data in the window data (status window data) as voice when executing the program for the voicing process. Hence, in this case the CPU 12 does not voice the content of the color ID display 83A and the paper size ID display 84A when executing the program for the voicing process.

After modifying the content of the residual ink identification display data and the residual paper identification display data based on the detailed residual quantity text voice setting, the CPU 12 ends the detailed residual quantity text display modification process of S26 and advances to S27.

In S27 the CPU 12 executes a status data acquisition process. In this process, the CPU 12 first transmits a status request signal to the printer 30. As described above, upon receiving a status request signal, in S4 the printer 30 transmits status data (see FIG. 5) indicating the current state of the printer 30 to the personal computer 10. The CPU 12 stores the status data received from the printer 30 in the RAM 14 and subsequently ends the status data acquisition process in S27 and advances to S28.

In S28 the CPU 12 determines whether the general status of the printer 30 has changed. Specifically, the CPU 12 performs this determination by referencing general status data included in the status data stored in the RAM 14. The CPU 12 advances to S29 if the general status of the printer 30 has changed (S28: YES). The CPU 12 advances to S31 if the general status has not changed (S28: NO).

In S29 the CPU 12 executes a general status display process. In this process, the CPU 12 first references the general status data in the status data stored in the RAM 14. Next, the CPU 12 updates the status data in the status window data (see FIGS. 14 and 15) to the newly acquired general status data. Subsequently, the CPU 12 displays the general status text 82 in the status window 80 based on the updated general status data. As a result, the updated general status text 82 is displayed in the status window 80. After completing the general status display process of S29, the CPU 12 advances to S30. The positions for displaying various data in the status window data within the status window 80 are predefined in the program for the status reporting process.

In S30 the CPU 12 executes a target modification process. In this process, the CPU 12 forcibly sets the general status text 82 as the focus control 65. In other words, the target modification process of S30 functions to forcibly set the general status data corresponding to the general status text 82 as the voicing target. After setting the general status text 82 as the focus control 65 in S30, the CPU 12 advances to S31.

As described above, if the CPU 12 determines in the voicing process of FIG. 6 that the focus control 65 has changed (S14: YES), in S15 the CPU 12 outputs voice based on the text data associated with the focus control 65. The general status data is included in the status window data as general text data (see FIG. 14). Hence, when the general status text 82 is set as the focus control 65 in the target modification process of S30, the voicing process starts, and in S15 the contents of the general status text 82 are outputted as voice based on the general status data based on the general text data in the status window data. As a result, the personal computer 10 can report the latest general status of the printer 30 to the user as voice.

In S31 the CPU 12 determines whether the status of residual consumables in the printer 30 has changed. The CPU 12 makes this determination by referencing the residual ink status data and the residual paper status data in the status data stored in the RAM 14. The CPU 12 advances to S32 when determining that the status of residual consumables has changed (S31: YES). The CPU 12 advances to S33 when determining that the status of residual consumables has not changed (S31: NO).

When advancing to S32, the CPU 12 executes a residual quantity status reporting process by executing a program for this process described later with reference to FIG. 13. In this process, the CPU 12 reports the residual quantities of ink and paper in the printer 30 to the user by displaying these residual quantities in the status window 80 and voicing the contents. The residual quantity status reporting process will be described later.

In S33 the CPU 12 determines whether an end program signal has been received. If an end program signal has been received (S33: YES), the CPU 12 executes a prescribed ending process and ends the program for the status reporting process. However, if an end program signal has not been received (S33: NO), the CPU 12 returns to S27 and again acquires status data from the printer 30. Subsequently, in S28-S32 the personal computer 10 updates the display in the status window 80 and outputs voice when there are any changes in the status of the printer 30. Through the display in the status window 80 and the outputted voice, the user can stay informed of the latest state of the printer 30.

Next, the residual quantity status reporting process executed by the printing mechanism 32 will be described. FIG. 13 is a flowchart illustrating steps in this process. The CPU 12 executes the program for this residual quantity status reporting process upon advancing to S32 in the status reporting process described above.

In S41 at the beginning of this process, the CPU 12 performs a process to generate residual quantity status images. Specifically, the CPU 12 references status data stored in the RAM 14 and generates residual ink status image data and residual paper status image data based on the residual ink status data and residual paper status data included in the status data (see FIG. 5). Next, the CPU 12 adds the image data generated for the residual ink status and residual paper status to the status window data (see FIG. 14). Subsequently, the CPU 12 displays the residual ink graph 83 based on the residual ink status image data, and the residual paper graph 84 based on the residual paper status image data in the status window 80. After displaying the residual ink graph 83 and the residual paper graph 84 in the status window 80, the CPU 12 advances to S42. In the present embodiment, the RAM 14 stores, in addition to the program for the status reporting process, graphical images for residual ink. The residual ink graph 83 is created by applying residual ink quantities in the residual ink status data to the graphical images for residual ink. That is, the graphical images are templates to create the residual ink graph 83.

In this way, the CPU 12 displays the latest status of residual consumables in the printer 30 as a graphical image in the status window 80. By viewing the residual ink graph 83 and the residual paper graph 84, the user can easily learn the latest status for residual ink and paper in the printer 30.

In S42 the CPU 12 determines whether the quantities of residual ink and residual paper in the printer 30 have dropped below corresponding prescribed warning reference values. Specifically, the CPU 12 references the residual ink status data and residual paper status data stored in the RAM 14 to acquire the amount of residual ink for each color and the amount of residual paper in the printer 30. Next, the CPU 12 compares the acquired quantities of residual ink and paper to their corresponding warning reference values. The CPU 12 advances to S48 if any of the quantities of residual ink and residual paper have dropped below the corresponding warning reference values (S42: YES). The CPU 12 advances to S43 if all of the residual quantities are no less than their corresponding warning reference values (S42: NO).

Figure 13:
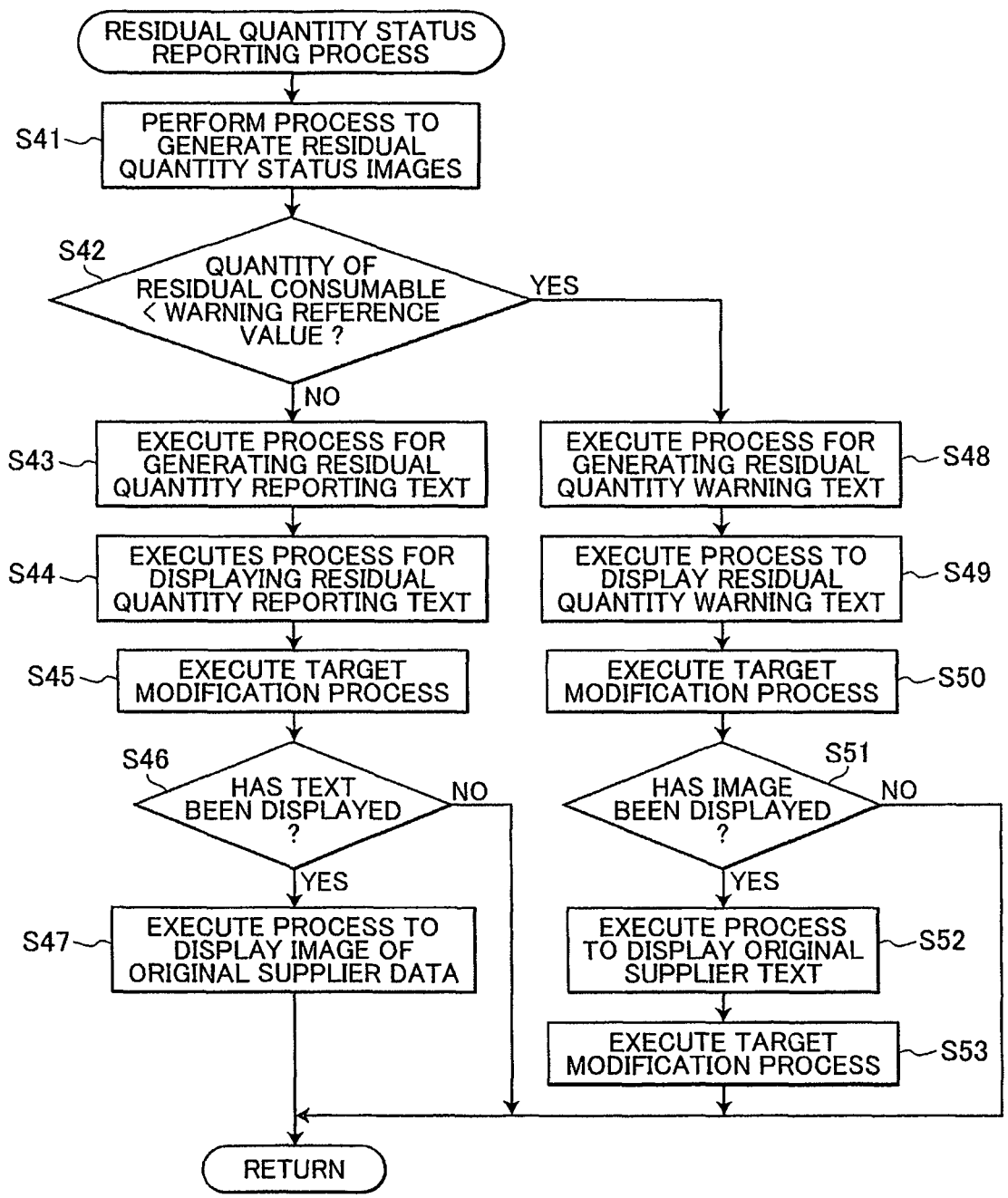
FIG. 13 is a flowchart illustrating steps in a residual quantity status reporting process.

As shown in FIG. 13, the process for residual quantity status reporting process diverges at this point based on the determination results in S42. First, a description will be given for the branch of the process including S43-S47 executed when all of the residual ink quantities and the residual paper quantities are no less than their corresponding warning reference values (S42: NO). The processes related to residual ink quantities and residual paper quantities are essentially identical in content, differing only in the object. Therefore, only one description of the processes will be given below, using residual ink as the example.

In S43 the CPU 12 executes a process for generating residual quantity reporting text. In this process, the CPU 12 generates residual ink status text data for the corresponding residual ink reporting text 86A in the residual ink graph 83 based on the residual ink status data. Subsequently, the CPU 12 advances to S44.

More specifically, in the process for generating residual quantity reporting text (S43), the CPU 12 references residual ink status data in the RAM 14 to acquire the quantity of residual ink in each color. As an example, the CPU 12 acquires residual ink quantities "Black: 100%," "Yellow: 55%," "Cyan: 85%," and "Magenta: 85%" from the residual ink status data. Subsequently, the CPU 12 extracts lexical data associated with the acquired residual ink quantities from the lexical database formed in the ROM 13 and generates text data for the residual ink status. Using the example described above, the CPU 12 generates the text data "Black: 100%," "Yellow: 55%," "Cyan: 85%," and "Magenta: 85%" to indicate the residual ink status. The CPU 12 adds this text data generated for reporting the residual ink status to the status window data (see FIG. 15).

In the process for generating residual quantity reporting text for S43, the CPU 12 performs a process to generate residual paper status text data for the residual paper reporting text 87A similarly to the process for residual ink. That is, in S43 the CPU 12 generates residual paper status text data indicating the residual paper status related to the residual paper reporting text 87A based on the residual paper status data and the lexical database. The CPU 12 adds this residual paper status text data to the status window data. After completing the process in S43 for generating residual quantity reporting text, the status window includes residual quantity status text data for the residual quantity reporting text (for example, residual ink status text data and residual paper status text data, see FIG. 15).

In S44 the CPU 12 executes a process for displaying the residual quantity reporting text. In this process, the CPU 12 displays the residual ink reporting text 86A and the residual paper reporting text 87A in the status window 80 based on the residual ink status text data and the residual paper status text data included in the status window data (see FIG. 12). After displaying the residual ink reporting text 86A and the residual paper reporting text 87A in the status window 80, the CPU 12 ends the display process of S44 and advances to S45.

In this example, the CPU 12 displays the residual ink reporting text 86A including "Black: 100%," "Yellow: 55%," "Cyan: 85%," and "Magenta: 85%" and the residual paper reporting text 87A including "A4: 75%" in the status window 80 when performing the process for displaying residual quantity reporting text in S44. Here, the residual ink reporting text 86A and the residual paper reporting text 87A are displayed in the status window 80 only when the status window 80 is set to the second display size (see FIG. 12). The residual ink reporting text 86A and the residual paper reporting text 87A are not displayed when the status window 80 is set to the first display size (see FIG. 11).

In S45 the CPU 12 executes the target modification process. In this process, the CPU 12 forcibly sets the residual quantity reporting text (residual ink reporting text 86A or residual paper reporting text 87A) that is displayed in S44 based on the residual paper status text data, as the focus control 65. After setting the residual quantity reporting text as the focus control 65, the CPU 12 ends the target modification process and advances to S46. Here, the CPU 12 sets as the focus control 65 the residual quantity reporting text corresponding to the target (ink or recording paper) whose status changed.

Accordingly, in the target modification process of S45, as described in the target modification process of S30, the CPU 12 acquires residual quantity status text data corresponding to the residual quantity reporting text set as the focus control 65 and outputs voice based on this acquired text data. As a result, the user can learn of changes in residual quantities of consumables, such as ink and recording paper, through the outputted voice.

In S46 the CPU 12 determines whether text has been displayed on the original supplier link button 85 based on the original supplier text data. If text has been displayed on the original supplier link button 85 (S46: YES), the CPU 12 advances to S47. However, if an image has been displayed on the original supplier link button 85 based on the original supplier image data (S46: NO), the CPU 12 ends the program implementing the residual quantity status reporting process. In other words, when an image is displayed on the original supplier link button 85 based on the original supplier image data, the original supplier data cannot be outputted as voice if the original supplier link button 85 is set as the focus control 65.

In S47 the CPU 12 executes a process to display an image of the original supplier data. In this process, the CPU 12 changes the display "Visit the original supplier's Web site" on the original supplier link button 85 from the text display to the image display. More specifically, the CPU 12 erases the display based on the original supplier text data and subsequently displays an image expressing the same content as the previous display on the original supplier link button 85 based on the original supplier image data. At this time, the CPU 12 applies a "voicing prohibited setting" to the original supplier text data included in the status window data.

In other words, by executing the process of S47 to display an image for the original supplier data, the CPU 12 displays an image on the original supplier link button 85 based on the original supplier image data. In this case, the original supplier data cannot be outputted as voice when the original supplier link button 85 is set as the focus control 65.

Next, a description will be given for the branch of the process in S48-S53 performed when any of the residual ink quantities falls below the corresponding warning reference value (S42: YES). Here again, in S48-S53, the process for residual ink quantities and the process for residual paper differ only in the target and have essentially the same content. Therefore, only one of the processes will be described below, using residual ink quantity as an example.

In S48 the CPU 12 executes a process for generating residual quantity warning text. In this process, the CPU 12 generates residual ink status text data related to the residual ink warning text 86B based on the residual ink status data. Subsequently, the CPU 12 advances to S49.

More specifically, in the process for generating residual quantity warning text, the CPU 12 identifies the color of ink that has dropped below the warning reference value by referencing the residual ink status data in the RAM 14. Next, the CPU 12 extracts lexical data required for the identified ink color from the lexical database stored on the ROM 13. Subsequently, the CPU 12 generates residual ink status text data for the residual ink warning text 86B based on the extracted lexical data.

For example, when the quantity of black ink has fallen below the warning reference value, the CPU 12 identifies the color black among the four ink colors based on the residual ink status data. Next, the CPU 12 uses lexical data extracted from the database to generate residual ink status text data such as "Please replace the black ink cartridge." Subsequently, the CPU 12 adds this residual ink status text data to the status window data.

In the process of S48 described above for generating residual quantity warning text, the CPU 12 performs a similar process to that described for residual ink in order to generate residual paper status text data for the residual paper warning text 87B. That is, in S48 the CPU 12 generates residual paper status text data for the residual paper warning text 87B based on the residual paper status data and the lexical database. Subsequently, the CPU 12 adds this residual paper status text data to the status window data. After the CPU 12 completes the process of S48, the status window data includes residual quantity status text data for residual quantity warning text (see FIG. 15).

In S49 the CPU 12 executes a process to display the residual quantity warning text. In this process, the CPU 12 displays the residual ink warning text 86B and the residual paper warning text 87B in the status window 80 based on the residual ink status text data and the residual paper status text data in the status window data (see FIG. 12). After displaying the residual ink warning text 86B and the residual paper warning text 87B in the status window 80, the CPU 12 ends the process for displaying residual quantity warning text in S49 and advances to S50.

Figure 17:
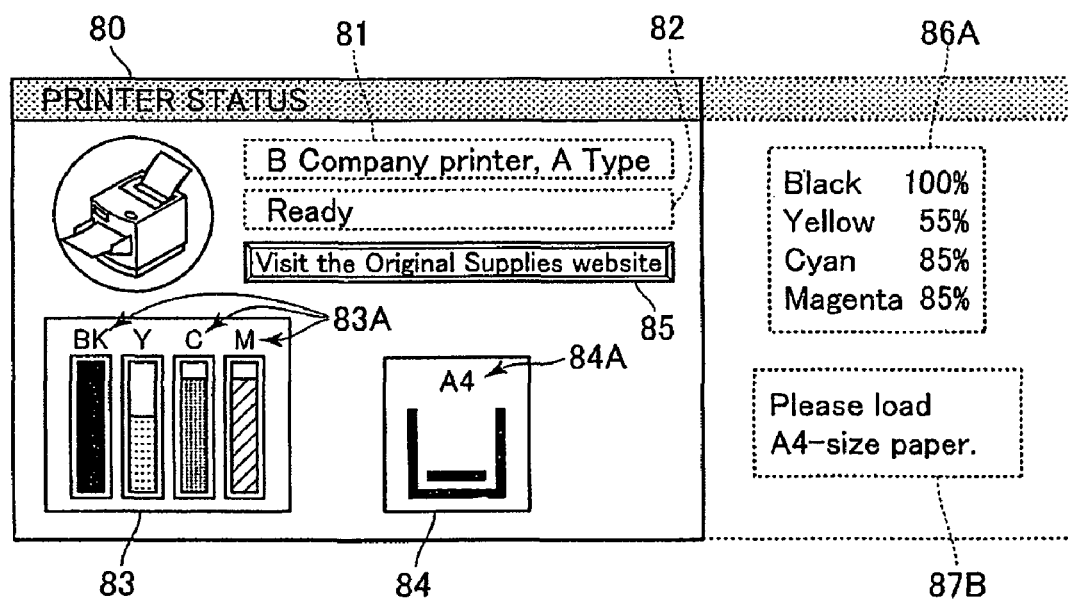
FIG. 17 is an explanatory diagram showing the status window when the residual paper warning text is voiced.

In the example described above, the CPU 12 displays the residual ink warning text 86B formed of the character string "Please replace the black ink cartridge" in the status window 80 (see FIG. 16). Alternatively, if residual paper status text data for the residual paper warning text 87B is added to the status window data, the CPU 12 displays the residual paper warning text 87B formed of the character string "Please load A4-size paper," for example, in the status window 80 (see FIG. 17).

In S50 the CPU 12 executes the target modification process. In this process, the CPU 12 forcibly sets the residual quantity warning text (the residual ink warning text 86B or the residual paper warning text 87B) that is displayed in S49 based on the residual paper status text, as the focus control 65. Thus, the CPU 12 outputs voice indicating a content of the residual quantity warning text. After setting this residual quantity warning text as the focus control 65, the CPU 12 ends the target modification process and advances to S51. Here, the CPU 12 sets the residual quantity warning text corresponding to the target whose residual status has dropped below the warning reference value (ink or recording paper) as the focus control 65.

By performing the target modification process of S50, similarly to the target modification process in S30 or S45, the voicing process starts and in S15 the CPU 12 can acquire residual quantity status text data corresponding to the residual quantity warning text set as the focus control 65 and output voice based on this text data. As a result, the user can learn through the outputted voice when one of the consumables (ink or recording paper) needs to be replenished or replaced.

In S51 the CPU 12 determines whether an image has been displayed on the original supplier link button 85 based on original supplier image data. If an image has been displayed on the original supplier link button 85 (S51: YES), the CPU 12 advances to S52. However, if an image has been displayed on the original supplier link button 85 based on original supplier text data (S51: NO), the CPU 12 ends the program for the residual quantity status reporting process. In the latter case, the text remains displayed on the original supplier link button 85 based on the original supplier text data. Accordingly, the CPU 12 can subsequently output voice based on this original supplier text data when the original supplier link button 85 is set as the focus control 65.

In S52 the CPU 12 executes a process to display the original supplier text. In this process, the CPU 12 converts the "Visit the original supplier's Web site" image displayed on the original supplier link button 85 from the image display to a text display. More specifically, the CPU 12 erases the above display based on the original supplier image data and subsequently displays text on the original supplier link button 85 expressing the same content as the above display but based on original supplier text data. At this time, the CPU 12 assigns a "voicing allowed setting" to the original supplier text data in the status window data and the "voicing prohibited setting" to the original supplier image data.

In S53 the CPU 12 executes a target modification process. In this process, the CPU 12 forcibly sets the original supplier link button 85 as the focus control 65, then the voicing process starts, and in S15 the CPU 12 outputs voice, "Visit the original supplier's Web site".

In other words, by executing the process in S52 to display the original supplier text, the CPU 12 displays text on the original supplier link button 85 based on the original supplier text data. In this case, the CPU 12 can reference the original supplier text data when setting the original supplier link button 85 to the focus control 65. As a result, the CPU 12 can output "Visit the original supplier's Web site" as voice based on the original supplier text data when the CPU 12 sets the original supplier link button 85 as the focus control 65. In this way, when it is necessary to refill or replace a consumable (ink or recording paper) in the embodiment, the printing system 1 can output voice to notify the user of information related to the original supplier of the consumable, facilitating the user in obtaining the required consumable from the original supplier.

As described above, the printing system 1 according to the embodiment and the control program for a printing system (e.g., the printer control program, the status reporting process program, and the like) add, to the status window data, residual quantity status text data (the residual ink status text data and the residual paper status text data) associated with content represented by each residual quantity status image data when the status window data includes residual ink status image data and residual paper status image data (S43, S48). Hence, the printing system 1 and the control program for a printing system can display the residual ink reporting text 86A, the residual paper reporting text 87A, and the like in the status window so.

Through the voicing program implementing the voicing process of FIG. 6, the printing system 1 can also output various text data included in the status window data (the general status data and the like) as voice. Further, the residual quantity status text data is added to the status window data, as described above. Hence, the printing system 1 and the control program for a printing system can output residual quantity status text data as voice, notifying the user through voice outputted based on the residual quantity status text data of the content represented in graphical images (the residual ink graph 83 and the residual paper graph 84) displayed based on residual quantity status image data.

Therefore, the printing system 1 and the control program for a printing system can report changes in the condition of the printer 30, not only to people who are physically unimpaired, but also to visually impaired users. That is, the printing system 1 and the control program for a printing system can accurately report the status of the printer 30 to all users. Thus, the user can monitor residual quantities of consumables used in the printer 30 (ink and recording paper) both visually and aurally and can take appropriate measures, such as loading and replacing consumables, when the residual quantities become low.

Further, by setting the display setting for the residual quantity status text, the printing system 1 and the control program for a printing system can change the display size of the status window 80 to the first display size or the second display size (S21-S24). The residual quantity status text is not displayed in the status window 80 when the status window 80 is set to the first display size (see FIG. 11). Accordingly, the printing system 1 and the control program for a printing system can provide the minimum required data in the status window 80 for sufficiently recording the state of the printer 30 (residual ink and paper quantities), without displaying data for the same content in multiple locations. In this case, the printing system 1 and the control program for a printing system execute a process to output voice based on the residual quantity status text data. Hence, the printing system 1 and the control program for a printing system output voice based on residual quantity status text data and display graphical images such as the residual ink graph 83 and the like, even when the status window 80 is displayed at the first display size, enabling users to learn the status of the printer 30 both visually and aurally.

On the other hand, the residual quantity status text is displayed in the status window 80 when the status window 80 is set to the second display size. In this case, the user can learn the state of the printer 30 through text displays, such as the residual ink reporting text 86A, in addition to the display of the graphical images and voice output, thereby more reliably notifying users regarding the condition of the printer 30. Further, since the user can arbitrarily set the first and second display sizes, the printing system 1 and control program for a printing system can display the status window 80 at the user-specified size (S21-S24).

When the state of the printer 30 changes (S28, S31), the printing system 1 and the control program for a printing system update the general status data and residual quantity status data in the status window data (S29, S32). Therefore, the printing system 1 and the control program for a printing system can update the display in the status window 80 showing the status of the printer (the general status text 82, the residual ink graph 83, and the residual ink reporting text 86A, for example) to the latest condition and can output the latest condition of the printer 30 as voice, thereby visually and aurally notifying the user of the latest state of the printer 30 each time status data (the general status data and the residual quantity status data) is updated.

Further, when the general status data and residual quantity status data are updated, the printing system 1 and the control program for a printing system set the component related to the updated comment as the focus control 65 (S30, S45, S50). When the focus control 65 is changed, the printing system 1 and the control program for a printing system output the changed element as voice (S14, S15). In this way, when the general status data and the residual quantity status data are updated, the printing system 1 and the control program for a printing system can output the updated content as voice so that the latest condition of the printer 30 can be reported as voice the moment the status changes.

When the residual quantity of a consumable is no less than the warning reference value (S42: NO), the printing system 1 and the control program for a printing system notify the user by displaying in the status window 80 (the residual ink reporting text 86A, for example) and voicing a residual quantity reporting message. Consequently, the user can reliably learn the residual quantities of consumables and can accurately determine whether printing is possible based on the remaining quantities of consumables when executing a printing operation on the printer 30.

When the residual quantity of a consumable drops below the warning reference value (S42: YES), the printing system 1 and the control program for a printing system notify the user with a residual quantity warning message displayed in the status window 80 (such as the display of the residual ink warning text 86B) and outputted as voice. In this way, the user can accurately learn the necessity for replacing or loading consumables and can take the appropriate measures, such as replacing an ink cartridge or loading recording paper.

If the residual quantity of a consumable is no less than the warning reference value (S42: NO), the printing system 1 and the control program for a printing system set the display in the original supplier link button 85 of the status window 80 to an image display based on the original supplier image data (S46, S47) so that information on the original consumable supplier associated with the original supplier link button 85 is not outputted as voice. However, when the residual quantity of a consumable falls below the warning reference value (S42: YES), the printing system 1 sets the display on the original supplier link button 85 to a text display based on the original supplier text data (S51, S52). In this case, the printing system 1 and the control program for a printing system voice information on the original consumable supplier corresponding to the original supplier link button 85 (S15, S53). Here, information related to the original supplier of the consumable is not particularly necessary when the residual quantity of the consumable has not dropped below the warning reference value. However, since a consumable will be soon required when the residual quantity of the consumable falls below the warning reference value, the necessity of information related to the supplier increases dramatically. Therefore, the printing system 1 and the control program for a printing system provides the user through voice with information on the original supplier of a consumable when the printer 30 is running low on the consumable.

The printing system 1 in the control program for a printing system can modify the detailed residual quantity text voice setting (S21-S26). Here, the color ID display 83A in the residual ink graph 83 and the paper size ID display 84A in the residual paper graph 84 sometimes do not make sense until displayed in combination with the residual ink graph 83 and residual paper graph 84. In other words, the user often cannot understand the content of the display when only text data for the residual ink identification display data corresponding to the residual ink graph 83 is voiced. Hence, the printing system 1 and the control program for a printing system can arbitrarily select whether to perform voicing associated with the paper size ID display 84A or the like, which the user may not be able to understand, even when voiced.

While the invention has been described in detail with reference to the above embodiments thereof, it would be apparent to those skilled in the art that various changes and modifications may be made therein without departing from the spirit of the invention.

In the embodiment described above, the content of the residual quantity status text data is modified to one of the residual quantity reporting message and the residual quantity warning message based on comparisons between the quantities of residual consumables and their corresponding warning reference values, but the invention is not limited to this configuration.

For example, it is possible to fix the content of the residual quantity status text data to content of the "residual quantity reporting message" and to modify the format of outputted voice, such as the volume, tone, playback speed, or monaural/stereo setting depending on the determination result in S42. For example, the printing system may output data in a male voice when the residual quantity of a consumable is no greater than the warning reference value and in a female voice when the residual quantity falls below the warning reference value. Alternatively, the printing system may output data at a low volume when the residual quantity of a consumable is no greater than the warning reference value and at a high volume when the residual quantity falls below the warning reference value. Similarly, the printing system may output data in a monaural format when the residual quantity of a consumable is no greater than the warning reference value and in a stereo format when the residual quantity falls below the warning reference value. Using these different sound forms, the user can easily recognize the state of the printer 30 related to the residual quantities of consumables based on the different tonal qualities of outputted voice.

It is also possible to modify the form in which voice is outputted, as described above, in addition to switching between the residual quantity reporting message and the residual quantity warning message based on the residual quantities of consumables. Consequently, the user can more easily recognize the state of the printer 30 related to the residual quantities of consumables based on the content of the message outputted as voice and the format of the outputted voice.

Further, the output format for voice in the embodiment described above is the same for residual ink quantities and residual paper quantities, but the format may be varied instead. For example, data for residual ink quantities may be outputted in a female voice, while data for residual paper quantities are outputted in a male voice, enabling the user to easily distinguish between a message related to residual ink quantities and a message related to residual paper quantities based on the difference in the tone of the outputted voice.

Further, when outputting a message to report residual ink quantities, the tone of the outputted voice may be varied for each color of ink, enabling the user to identify the color of ink being reported based on the different tonality of the outputted voice.

Further, while advanced settings in the status window can be executed only in S21 and S22 in the embodiment described above, the invention is not limited to this configuration. The printing system may be configured to accept advanced settings for the status window at all times. Further, while the printing system 1 and the control program for a printing system are described in the embodiment, the invention may also be applied to a print data processor (the personal computer 10, for example) and to a control program on the print data processor.

In the embodiment described above, the personal computer 10 is separated from the printer 30. However, the printer 30 may be integrated with the computer 10. In this case, the printer 30 includes the display unit 15 and performs the voicing process and the status reporting process.

Some parts of the process that is performed in the personal computer 10 in the embodiment may be performed in the printer 30. For example, the printer 30 may generate, based on the status data, the general status text data, the original supplier data, the residual ink status image data, the residual paper status image data, the residual ink status text data, and the residual paper status text data. In this case, the printer 30 may have a display unit. The display unit of the printer 30 may display the general status text data, the original supplier data, the residual ink status image data, the residual paper status image data, the residual ink status text data, and the residual paper status text data that are generated in the printer 30. Alternatively, the printer 30 may output, to the personal computer 10, the general status text data, the original supplier data, the residual ink status image data, the residual paper status image data, the residual ink status text data, and the residual paper status text data that are generated in the printer 30. In this case, the display unit 15 of the personal computer 10 displays, as the window data, the general status text data, the original supplier data, the residual ink status image data, the residual paper status image data, the residual ink status text data, and the residual paper status text data.

What is claimed is:

1. A printing system comprising:
   a printing device that is configured to perform printing based on print data by using consumables, the printing device comprising a status data generating unit that generates status data indicating a status of the printing device;
   a storing unit that stores status image data that graphically indicates a content of the status data;
   a text data generating unit that generates status text data that explanatorily indicates a content of the status image data with words; and
   a printing data processing device comprising:
     a display unit that displays a window;
     a window data storing unit that stores window data having information about the window, the window data being used to display the window;
     a data editing unit that edits the window data to include the status text data and the status image data, the display unit displaying the window by using the window data such that the window displays an image corresponding to the status image data and a text corresponding to the status text data;
     a specifying unit that specifies the text on the window; and
     a voicing unit that voices the specified text based on the corresponding status text data,
   wherein the status text data indicates a remaining amount of the consumables,
   wherein the window data comprises general text data indicating whether the printing device is capable of printing or not,
   the printing data processing device further comprising a display controller that controls the display unit to display the window in a first display form in which the window displays a text corresponding to the general text data and an image corresponding to the status image data without displaying a text corresponding to the status text data,
   wherein when the specified text corresponds to the general text data, the voicing unit voices the specified text corresponding to the general text data, and
   wherein the display controller controls the display unit to display the window in a second display form in which the window displays a text corresponding to the general text data, an image corresponding to the status image data, and a text corresponding to the status text data.

2. The printing system according to claim 1, wherein the display controller is capable of switching from the window in the first display form to the window in the second display form and vice versa.

3. A printing system comprising:
   a printing device that is configured to perform printing based on print data by using consumables, the printing device comprising a status data generating unit that generates status data indicating a status of the printing device;
   a storing unit that stores status image data that graphically indicates a content of the status data;
   a text data generating unit that generates status text data that explanatorily indicates a content of the status image data with words;
   a printing data processing device comprising:
     a display unit that displays a window;
     a window data storing unit that stores window data having information about the window, the window data being used to display the window;
     a data editing unit that edits the window data to include the status text data and the status image data, the display unit displaying the window by using the window data such that the window displays an image corresponding to the status image data and a text corresponding to the status text data;
     a specifying unit that specifies the text on the window;
     a voicing unit that voices the specified text based on the corresponding status text data; and
     a determining unit that determines whether the status data is changed,
   wherein if the status data is changed, the data editing unit updates the status image data included in the window data that is stored in the window data storing unit to indicate graphically a content of current status data and updates the status text data included in the window data that is stored in the window data storing unit to indicate explanatorily updated status image data with words, wherein the window comprises a plurality of items, each item displaying text based on the window data, and wherein if the status image is changed and if the data editing unit updates the status text data, the display unit displays text corresponding to the updated text data in an item among the plurality of items, the specifying unit specifies the text in the item displayed on the window corresponding to the status text data and the voicing unit voices the text based on the status text data.

4. A printing system comprising:

a printing device that is configured to perform printing based on print data by using consumables, the printing device comprising a status data generating unit that generates status data indicating a status of the printing device;

a storing unit that stores status image data that graphically indicates a content of the status data;

a text data generating unit that generates status text data that explanatorily indicates a content of the status image data with words; and a printing data processing device comprising:
  a display unit that displays a window;
  a window data storing unit that stores window data having information about the window, the window data being used to display the window;
  a data editing unit that edits the window data to include the status text data and the status image data, the display unit displaying the window by using the window data such that the window displays an image corresponding to the status image data and a text corresponding to the status text data;
  a specifying unit that specifies the text on the window; and
  a voicing unit that voices the specified text based on the corresponding status text data, wherein the status data comprises remaining amount data indicating a remaining amount of the consumables, wherein the storing unit stores graph data indicating a graph of the remaining amount of the consumable, wherein the text data generating unit generates, based on the remaining amount data, remaining amount reporting text data indicating the remaining amount of the consumables, wherein the data editing unit adds the graph data and the remaining amount reporting text data to the window data in the window data storing unit, wherein the printing data processing device further comprises a remaining amount determining unit that determines, based on the status data, whether the remaining amount of the consumables is less than a prescribed value, and wherein if the remaining amount of the consumables is equal to or greater than the prescribed value, the text data generating unit generates, as status text data, the remaining amount reporting text data, the editing unit adds the remaining amount reporting text data to the window data in the window data storing unit whereas if the remaining amount of the consumables is less than the prescribed value, the text data generating unit generates, as status text data, warning text data warning to replace or to replenish the consumables, and the editing unit adds the warning text data to the window data in the window data storing unit.

5. A printing system comprising:

a printing device that is configured to perform printing based on print data by using consumables, the printing device comprising a status data generating unit that generates status data indicating a status of the printing device;

a storing unit that stores status image data that graphically indicates a content of the status data;

a text data generating unit that generates status text data that explanatorily indicates a content of the status image data with words; and a printing data processing device comprising:
  a display unit that displays a window;
    a window data storing unit that stores window data having information about the window, the window data being used to display the window;
    a data editing unit that edits the window data to include the status text data and the status image data, the display unit displaying the window by using the window data such that the window displays an image corresponding to the status image data and a text corresponding to the status text data;
    a specifying unit that specifies the text on the window; and
    a voicing unit that voices the specified text based on the corresponding status text data, wherein the status data comprises remaining amount data indicating a remaining amount of the consumables, wherein the storing unit stores graph data indicating a graph of the remaining amount of the consumable, wherein the text data generating unit generates, based on the remaining amount data, remaining amount reporting text data indicating the remaining amount of the consumables, wherein the data editing unit adds the graph data and the remaining amount reporting text data to the window data in the window data storing unit, wherein the window data comprises supplier data indicating an original supplier of the consumables, wherein the printing data processing device further comprises a remaining amount determining unit that determines, based on the status data, whether the remaining amount of the consumables is less than a prescribed value, and wherein if the remaining amount of the consumables is equal to or greater than the prescribed value, the display controller controls the display unit to display, based on the supplier data, an image display that indicates the original supplier of the consumables on the window whereas if the remaining amount of the consumables is less than the prescribed value, the display controller controls the display unit to display, based on the supplier data, a text display that indicates the original supplier of the consumables on the window.

6. A printing system comprising:

a printing device that is configured to perform printing based on print data by using consumables, the printing device comprising a status data generating unit that generates status data indicating a status of the printing device;

a storing unit that stores status image data that graphically indicates a content of the status data;

a text data generating unit that generates status text data that explanatorily indicates a content of the status image data with words; and a printing data processing device comprising:
  a display unit that displays a window;

a window data storing unit that stores window data having information about the window, the window data being used to display the window;

a data editing unit that edits the window data to include the status text data and the status image data, the display unit displaying the window by using the window data such that the window displays an image corresponding to the status image data and a text corresponding to the status text data;

a specifying unit that specifies the text on the window; and a voicing unit that voices the specified text based on the corresponding status text data, wherein the status data comprises remaining amount data indicating a remaining amount of the consumables, wherein the storing unit stores graph data indicating a graph of the remaining amount of the consumable, wherein the text data generating unit generates, based on the remaining amount data, remaining amount reporting text data indicating the remaining amount of the consumables, wherein the data editing unit adds the graph data and the remaining amount reporting text data to the window data in the window data storing unit, wherein the window data comprises:
  a graph image that indicates a graph of the remaining amount of the consumables; and
    explanative text data that explains a content of the graph image, wherein the printing device comprises a voice setting unit that sets to voice or not to voice text that is based on the explanative text data, wherein if the voicing setting unit sets to voice the text that is based on the explanative text data, the display controller displays a text display based on the explanative text data on the window whereas if the voicing setting unit sets not to voice the text that is based on the explanative text data, the display controller displays an image based on the explanative text data on the window.

7. A non-transitory computer-readable storage medium storing a set of program instructions executed by a computer for controlling a printing system that comprises a printing device, a storing unit, and a printing data processing device, the printing device being configured to perform printing based on print data by using consumables, the printing device comprising a status data generating unit that generates status data indicating a status of the printing device, the storing unit storing status image data that graphically indicates a content of the status data, the printing data processing device comprising a display unit and a window data storing unit, the display unit displaying a window, the window data storing unit storing window data having information about the window, the window data being used to display the window, the program instructions comprising:

generating status text data that explanatorily indicates a content of the status image data with words;

editing the window data to include the status text data and the status image data;

displaying the window by using the window data such that the window displays an image corresponding to the status image data and a text corresponding to the status text data;

specifying the text on the window; and voicing the specified text based on the corresponding status text data, wherein the status text data indicates a remaining amount of the consumables, wherein the window data comprises general text data indicating whether the printing device is capable of printing or not, wherein the displaying instruction displays the window in a first display form in which the window displays a text corresponding to the general text data and an image corresponding to the status image data without displaying a text corresponding to the status text data, wherein when the specified text corresponds to the general text data, the voicing instruction voices the specified text corresponding to the general text data, and wherein the displaying instruction displays the window in a second display form in which the window displays a text corresponding to the general text data, an image corresponding to the status image data, and a text corresponding to the status text data.

8. The computer-readable storage medium according to claim 7, wherein the displaying instruction comprises switching from the window in the first display form to the window in the second display form and vice versa.

9. A non-transitory computer-readable storage medium storing a set of program instructions executed by a computer for controlling a printing system that comprises a printing device, a storing unit, and a printing data processing device, the printing device being configured to perform printing based on print data by using consumables, the printing device comprising a status data generating unit that generates status data indicating a status of the printing device, the storing unit storing status image data that graphically indicates a content of the status data, the printing data processing device comprising a display unit and a window data storing unit, the display unit displaying a window, the window data storing unit storing window data having information about the window, the window data being used to display the window, the program instructions comprising:

generating status text data that explanatorily indicates a content of the status image data with words;

editing the window data to include the status text data and the status image data;

displaying the window by using the window data such that the window displays an image corresponding to the status image data and a text corresponding to the status text data;

specifying the text on the window;

voicing the specified text based on the corresponding status text data, determining whether the status data is changed; and updating the status image data included in the window data that is stored in the window data storing unit to indicate graphically a content of current status data and the status text data included in the window data that is stored in the window data storing unit to indicate explanatorily updated status image data with words if the status data is changed, wherein the window comprises a plurality of items, each item displaying text based on the window data, wherein the program instructions further comprise:

displaying text corresponding to the updated text data in an item among the plurality of items if the status image is changed and if the updating instruction updates the status text data;

specifying the text in the item displayed on the window corresponding to the status text data; and voicing the text based on the status text data.

10. A non-transitory computer-readable storage medium storing a set of program instructions executed by a computer for controlling a printing system that comprises a printing device, a storing unit, and a printing data processing device, the printing device being configured to perform printing based on print data by using consumables, the printing device comprising a status data generating unit that generates status data indicating a status of the printing device, the storing unit storing status image data that graphically indicates a content of the status data, the printing data processing device comprising a display unit and a window data storing unit, the display unit displaying a window, the window data storing unit storing window data having information about the window, the window data being used to display the window, the program instructions comprising:

generating status text data that explanatorily indicates a content of the status image data with words;

editing the window data to include the status text data and the status image data;

displaying the window by using the window data such that the window displays an image corresponding to the status image data and a text corresponding to the status text data;

specifying the text on the window; and voicing the specified text based on the corresponding status text data, herein the status data comprises remaining amount data indicating a remaining amount of the consumables, wherein the storing unit stores graph data indicating a graph of the remaining amount of the consumables, wherein the generating instruction generates, based on the remaining amount data, remaining amount reporting text data indicating the remaining amount of the consumables, wherein the editing instruction edits the window data in the window data storing unit to include the remaining amount reporting text data, wherein the program instructions further comprise determining, based on the status data, whether a remaining amount of the consumables is less than a prescribed value, and wherein if the remaining amount of the consumables is equal to or greater than the prescribed value, the generating instruction generates, as status text data, the remaining amount reporting text data, the editing instruction adds the remaining amount reporting text data to the window data in the window data storing unit whereas if the remaining amount of the consumables is less than the prescribed value, the generating instruction generates, as status text data, warning text data warning to replace or to replenish the consumables, and the editing instruction adds the warning text data to the window data in the window data storing unit.

11. A non-transitory computer-readable storage medium storing a set of program instructions executed by a computer for controlling a printing system that comprises a printing device, a storing unit, and a printing data processing device, the printing device being configured to perform printing based on print data by using consumables, the printing device comprising a status data generating unit that generates status data indicating a status of the printing device, the storing unit storing status image data that graphically indicates a content of the status data, the printing data processing device comprising a display unit and a window data storing unit, the display unit displaying a window, the window data storing unit storing window data having information about the window, the window data being used to display the window, the program instructions comprising:

generating status text data that explanatorily indicates a content of the status image data with words;

editing the window data to include the status text data and the status image data;

displaying the window by using the window data such that the window displays an image corresponding to the status image data and a text corresponding to the status text data;

specifying the text on the window; and voicing the specified text based on the corresponding status text data, wherein the status data comprises remaining amount data indicating a remaining amount of the consumables, wherein the storing unit stores graph data indicating a graph of the remaining amount of the consumables, wherein the generating instruction generates, based on the remaining amount data, remaining amount reporting text data indicating the remaining amount of the consumables, wherein the editing instruction edits the window data in the window data storing unit to include the remaining amount reporting text data, wherein the window data comprises supplier data indicating an original supplier of the consumables, wherein the program instructions further comprise determining, based on the status data, whether a remaining amount of the consumables is less than a prescribed value, and wherein if the remaining amount of the consumables is equal to or greater than the prescribed value, the display instruction displays, based on the supplier data, an image display that indicates the original supplier of the consumables on the window whereas if the remaining amount of the consumables is less than the prescribed value, the display instruction displays, based on the supplier data, a text display that indicates the original supplier of the consumables on the window.

12. A non-transitory computer-readable storage medium storing a set of program instructions executed by a computer for controlling a printing system that comprises a printing device, a storing unit, and a printing data processing device, the printing device being configured to perform printing based on print data by using consumables, the printing device comprising a status data generating unit that generates status data indicating a status of the printing device, the storing unit storing status image data that graphically indicates a content of the status data, the printing data processing device comprising a display unit and a window data storing unit, the display unit displaying a window, the window data storing unit storing window data having information about the window, the window data being used to display the window, the program instructions comprising:

generating status text data that explanatorily indicates a content of the status image data with words;

editing the window data to include the status text data and the status image data;

displaying the window by using the window data such that the window displays an image corresponding to the status image data and a text corresponding to the status text data;

specifying the text on the window; and voicing the specified text based on the corresponding status text data, wherein the status data comprises remaining amount data indicating a remaining amount of the consumables, wherein the storing unit stores graph data indicating a graph of the remaining amount of the consumables, wherein the generating instruction generates, based on the remaining amount data, remaining amount reporting text data indicating the remaining amount of the consumables, wherein the editing instruction edits the window data in the window data storing unit to include the remaining amount reporting text data, wherein the window data comprises:
- a graph image that indicates a graph of the remaining amount of the consumables; and
- explanative text data that explains a content of the graph image, wherein the program instructions further comprise setting to voice or not to voice text that is based on the explanative text data, and wherein if the setting instruction sets to voice the text that is based on the explanative text data, the displaying instruction displays a text display based on the explanative text data on the window whereas if the setting instruction sets not to voice the text that is based on the explanative text data, the displaying instruction displays an image based on the explanative text data on the window.

* * * * *